(12) United States Patent
Hoshikawa et al.

(10) Patent No.: US 8,440,365 B2
(45) Date of Patent: May 14, 2013

(54) ELECTROLYTE, PRODUCTION PROCESS THEREFOR, ELECTROLYTE MEMBRANE, PRODUCTION PROCESS THEREFOR, CATALYST LAYER AND FUEL CELL

(75) Inventors: Naohiro Hoshikawa, Nisshin (JP); Naoki Hasegawa, Kasugai (JP); Yoichi Hosokawa, Nisshin (JP); Masaya Kawasumi, Anjyo (JP); Akihiro Shinohara, Aichi-gun (JP); Hiromitsu Tanaka, Aichi-gun (JP); Masayoshi Takami, Hamamatsu (JP); Toshihiko Yoshida, Fujimi (JP)

(73) Assignees: Kabushiki Kaisha Toyota Chuo Kenkyusho, Aichi (JP); Toyota Jidosha Kabushiki Kaisha, Toyota (JP)

( * ) Notice: Subject to any disclaimer, the term of this patent is extended or adjusted under 35 U.S.C. 154(b) by 1169 days.

(21) Appl. No.: 12/318,411

(22) Filed: Dec. 29, 2008

(65) Prior Publication Data
US 2009/0191442 A1 Jul. 30, 2009

(30) Foreign Application Priority Data

Jan. 8, 2008 (JP) .................................. 2008-001544
Dec. 24, 2008 (JP) .................................. 2008-328792

(51) Int. Cl.
*H01M 8/10* (2006.01)
(52) U.S. Cl.
USPC ........................................................ 429/492
(58) Field of Classification Search .................. 429/493, 429/492
See application file for complete search history.

(56) References Cited

U.S. PATENT DOCUMENTS

| 2006/0160960 | A1* | 7/2006 | Chang et al. | ................... | 525/344 |
| 2007/0021569 | A1* | 1/2007 | Willis et al. | ................... | 525/314 |
| 2007/0105008 | A1* | 5/2007 | Gu et al. | ......................... | 429/44 |
| 2008/0063922 | A1* | 3/2008 | Jang et al. | ........................ | 429/42 |
| 2009/0061277 | A1* | 3/2009 | Sayre et al. | ..................... | 429/33 |
| 2011/0053043 | A1* | 3/2011 | Balsara et al. | ................ | 429/493 |

FOREIGN PATENT DOCUMENTS

| JP | A-11-329062 | 11/1999 |
| JP | A-2004-190003 | 7/2004 |
| JP | A-2004-331972 | 11/2004 |
| JP | A-2005-126684 | 5/2005 |
| JP | A-2005-268011 | 9/2005 |
| JP | A-2006-512428 | 4/2006 |
| JP | A-2006-210326 | 8/2006 |
| JP | A-2006-252813 | 9/2006 |
| JP | A-2006-342342 | 12/2006 |

OTHER PUBLICATIONS

Japanese Office Action dated Sep. 25, 2012 from Japanese Patent Application No. 2008-328792 (with English-language translation).

* cited by examiner

*Primary Examiner* — Patrick Ryan
*Assistant Examiner* — Lucas J O Donnell
(74) *Attorney, Agent, or Firm* — Oliff & Berridge, PLC

(57) ABSTRACT

An electrolyte having a structure where a fluorinated hydrophilic segment A represented by $-E_2-[Rf-E_1]_m-$ and a hydrocarbon hydrophobic segment B are alternately bonded to each other through chemical bond and a production process therefor, and an electrolyte membrane, a production process therefor, a catalyst layer and a fuel cell using the same. Rf is a linear or a branched perfluoro chain having one or more carbon atoms, $E_1$, and $E_2$ are each a proton conductive portion represented by Formula $-(CONM)_{i1}(CO)_{i2}(SO_2NM)_{i3}(SO_2)_{i4}-$ ($0 \leq i_1, 0 \leq i_2 \leq 1, 0 \leq i_3, 0 \leq i_4 \leq 1, 0 < i_1 + i_3, i_1$ to $i_4$ are each an integer, and M is proton, alkali metal, or alkali earth metal), $2 \leq m$ (m is an integer), and Rf, $E_1$, and $E_2$ may be each arbitrarily selected in the repeating unit.

27 Claims, 5 Drawing Sheets

ELECTROLYTE, PRODUCTION PROCESS THEREFOR, ELECTROLYTE MEMBRANE, PRODUCTION PROCESS THEREFOR, CATALYST LAYER AND FUEL CELL

BACKGROUND OF THE INVENTION

1. Field of the Invention

The present invention relates to an electrolyte, a production process therefor, an electrolyte membrane, a production process therefor, a catalyst layer and a fuel cell, and more particularly, to an electrolyte that is capable of being used in an electrolyte membrane and an electrolyte in a catalyst layer that are used in various electrochemical devices such as fuel cells, a production process therefor, and an electrolyte membrane, a production process therefor, a catalyst layer and a fuel cell using the electrolyte.

2. Description of the Related Art

A solid polymer fuel cell uses a membrane electrode assembly (MEA) in which electrodes are attached to both sides of a solid polymer electrolyte membrane as a basic unit. In addition, in the solid polymer fuel cell, an electrode generally has a two layer structure of a diffusion layer and a catalyst layer. The diffusion layer is a layer to provide a reaction gas and electrons to the catalyst layer, and carbon paper, carbon cloth and the like may be used for the diffusion layer. Additionally, the catalyst layer is a portion of a reaction field of electrode reaction and generally includes a complex of carbon carrying an electrode catalyst such as platinum and the like and a solid polymer electrolyte (electrolyte in the catalyst layer).

As the electrolyte membrane or the electrolyte in the catalyst layer that constitutes MEA, in general, a fluorocarbon-type electrolyte having excellent oxidation resistance (for example, Nafion (registered trademark, manufactured by DuPont Co., Ltd.), Aciplex (registered trademark, Asahi Chemical Co., Ltd.), and Flemion (registered trademark, Asahi Glass Co., Ltd.)) is used. Furthermore, the fluorocarbon-type electrolyte has excellent oxidation resistance but is costly. Accordingly, in order to reduce the cost of the solid polymer fuel cell, the use of a hydrocarbon-type electrolyte has been studied.

However, in order to use the solid polymer fuel cell as a power source for vehicles, some problems to be resolved have been left. For example, in order to obtain high performance in the solid polymer fuel cell, it is preferable that an operation temperature of a cell is high, and that heat resistance of the electrolyte membrane is high. However, the known fluorinated electrolyte membrane has a problem in that mechanical strength is low at high temperatures.

In addition, currently, operation of the fuel cell at high temperatures and low humidity or no humidity condition is considered to be important. Under the condition, in order to realize high proton conductivity, an electrolyte having high ion exchange capacity is required. However, since the electrolyte having the high ion exchange capacity has high water content, a swelling change of the membrane is significant. Therefore, the shape of the membrane may not be maintained or it may be dissolved in water. The trade-off of the high conductivity and the high water content is considered an important problem to be overcome.

Therefore, in order to solve the problems, some suggestions have been given.

For example, Patent Document 1 discloses a copolymer that is obtained by copolymerizing $F-C_6H_4-SO_2NKSO_2-(CF_2)_4-SO_2NKSO_2-C_6H_4-F$, $Cl-C_6H_4-SO_2-C_6H_4-Cl$, and $HO-C_6H_4-C_6H_4-OH$.

The Document describes that the conductivity of the copolymer obtained by using the above method is 156 mS/cm at the temperature of 85° C. and relative humidity of 95%.

Further, Patent Document 2 discloses a block copolymer in which a hydrophilic segment includes poly(parapenylene) as a main chain and a sulfonic acid group bonded through an alkyl group thereto as a side chain, and a hydrophobic segment includes polyether ketone.

Further, Patent Document 3 discloses a block copolymer in which a hydrophilic segment includes a vinyl polymer such as poly($\alpha$-methylstyrene) and a hydrophobic segment includes an aliphatic polymer such as polybutadiene.

Further, Patent Document 4 discloses a block copolymer in which a hydrophilic segment includes a fluorinated poly(vinyl ether) having a sulfonic acid group and a hydrophobic segment includes a fluorinated poly(vinyl ether) having no sulfonic acid group.

Further, Patent Document 5 discloses a block copolymer in which a hydrophilic segment includes a fluorinated poly(vinyl ether) having a sulfonic acid group and a hydrophobic segment includes poly ether sulfone partially having a fluorine atom.

[Patent Document 1] Japanese Patent Application Laid-Open No. 2004-331972

[Patent Document 2] Japanese Patent Application Laid-Open No. 2006-252813

[Patent Document 3] Japanese Patent Application Laid-Open No. 2006-210326

[Patent Document 4] Japanese Patent Application Laid-Open No. H11 (1999)-329062

[Patent Document 5] Japanese Patent Application Laid-Open No. 2004-190003

If a polymer being a hydrophilic segment and including high ion exchange capacity is bonded to a polymer being a hydrophobic segment to produce a block copolymer, swelling change of the membrane and dissolution in water may be suppressed. The problems may be solved by separating abilities of providing proton conductivity and mechanical strength of the membrane to the hydrophilic segment and the hydrophobic segment, respectively.

However, if the hydrocarbon polymer (it may partially include a fluorine atom) is used in both the hydrophilic segment and the hydrophobic segment of an electrolyte, the electrolyte is oxidized with hydrogen peroxide (or hydroxy radical) formed at power generation of a fuel cell and thereby a function required in the electrolyte is removed. Meanwhile, if the fluorinated polymer is used in both the hydrophilic segment and the hydrophobic segment, the oxidation resistance is good. However, if the fluorinated polymer is used in both segments, there are problems in that the cost is increased and a load to environment is increased.

In addition, in order to use the electrolyte as the electrolyte membrane for the fuel cell, not only the high heat resistance, but also high gas barrier property and predetermined flexibility are required.

SUMMARY OF THE INVENTION

It is an object of the present invention to provide an electrolyte that has high conductivity and is difficult to swell or dissolve in water and a production process therefor, and an electrolyte membrane, a production process therefor, a catalyst layer and a fuel cell using the electrolyte.

It is another object of the present invention to provide an electrolyte that is low-priced and has a low load to environment and a production process therefor, and an electrolyte membrane, a production process therefore, catalyst layer and a fuel cell using the electrolyte.

It is still another object of the present invention to provide an electrolyte that has high heat resistance and oxidation resistance, and has commercially sufficient gas barrier property and flexibility when it is used as a membrane and a production process therefor, and an electrolyte membrane, a production process therefor, a catalyst layer and a fuel cell using the electrolyte.

In order to solve the above problems, an electrolyte according to the present invention has a structure where a fluorinated hydrophilic segment A represented by Formula (1) and a hydrocarbon hydrophobic segment B are alternately bonded to each other through chemical bond:

$$A: -E_2-[Rf-E_1]_m- \quad (1)$$

wherein Rf is a linear or a branched perfluoro chain having one or more carbon atoms, $E_1$, and $E_2$ are each a proton conductive portion represented by Formula

$(0 \leq i_1, 0 \leq i_2 \leq 1, 0 \leq i_3, 0 \leq i_4 \leq 1, 0 < i_1 + i_3, i_1$ to $i_4$ are each an integer, and M is proton, alkali metal (Li, Na, K, Rb, Cs, and Fr), or alkali earth metal (Be, Mg, Ca, Sr, Ba, and Ra)), $2 \leq m$ (m is an integer), and Rf, $E_1$, and $E_2$ may be each arbitrarily selected in the repeating unit.

Additionally, a process for producing an electrolyte according to the present invention comprises a reaction step of reacting one or more polymer A in which functional groups are bonded to both ends of the fluorinated hydrophilic segment A represented by Formula (1), or one or more monomer A or polymer A that is capable of forming the hydrophilic segment A, and one or more polymer B in which functional groups are bonded to both ends of the hydrocarbon hydrophobic segment B, or one or more monomer B or polymer B that is capable of forming the hydrophobic segment B:

$$A: -E_2-[Rf-E_1]_m- \quad (1)$$

wherein Rf is a linear or a branched perfluoro chain having one or more carbon atoms, $E_1$, and $E_2$ are each a proton conductive portion represented by Formula

$(0 \leq i_1, 0 \leq i_2 \leq 1, 0 \leq i_3, 0 \leq i_4 \leq 1, 0 < i_1 + i_3, i_1$ to $i_4$ are each an integer, and M is proton, alkali metal (Li, Na, K, Rb, Cs, and Fr), or alkali earth metal (Be, Mg, Ca, Sr, Ba, and Ra)), $2 \leq m$, and Rf, $E_1$, and $E_2$ may be each arbitrarily selected in the repeating unit.

In addition, the electrolyte membrane according to the present invention uses the electrolyte according to the present invention. The process for producing the electrolyte membrane according to the present invention includes a step of dissolving the electrolyte according to the present invention in a solvent, and forming a membrane by casting obtained solution of the electrolyte. The process for producing the electrolyte membrane that includes a complex of the electrolyte according to the present invention and a porous material includes a step of dissolving the electrolyte according to the present invention in a solvent, charging the solution in the porous material, and removing the solvent.

Further, the catalyst layer according to the present invention uses the electrolyte according to the present invention as an electrolyte in the catalyst layer. Additionally, a fuel cell according to the present invention uses the electrolyte according to the present invention.

Since the electrolyte according to the present invention uses a fluorinated segment having the high ion exchange capacity for the hydrophilic segment, it has high proton conductivity and high oxidation resistance. Meanwhile, the hydrophobic segment includes the hydrocarbon segment, but in the electrolyte, since the hydrophilic segment and the hydrophobic segment are separated from each other in a micro-phase, it is difficult to oxidize the hydrocarbon segment. It is deemed that hydrogen peroxide or hydroxy radical oxidizing the membrane is present in the hydrophilic segment having water. In particular, when the hydrophilic segment and the hydrophobic segment both of which have a predetermined molecular weight or more are block copolymerized, since a microphase separation structure is apparent, there is a low possibility of attacking of hydrogen peroxide or hydroxy radical to the hydrophobic segment. Further, even if the hydrophobic segment is oxidized, since the hydrophobic segment does not include fluorine, a load to environment is small.

In addition, if the molecular weight of the hydrophobic segment is increased to a predetermined value or more, the membrane may be made insoluble. Further, if the hydrocarbon segment is used in the hydrophobic segment, the gas barrier property of the electrolyte membrane is improved. Further, in general, the electrolyte membrane that includes only the hydrocarbon polymer is hard, but if a soft fluorinated segment is used as the hydrophilic segment, flexibility may be provided to the membrane.

DETAILED DESCRIPTION OF THE PREFERRED EMBODIMENTS

Figure 1:
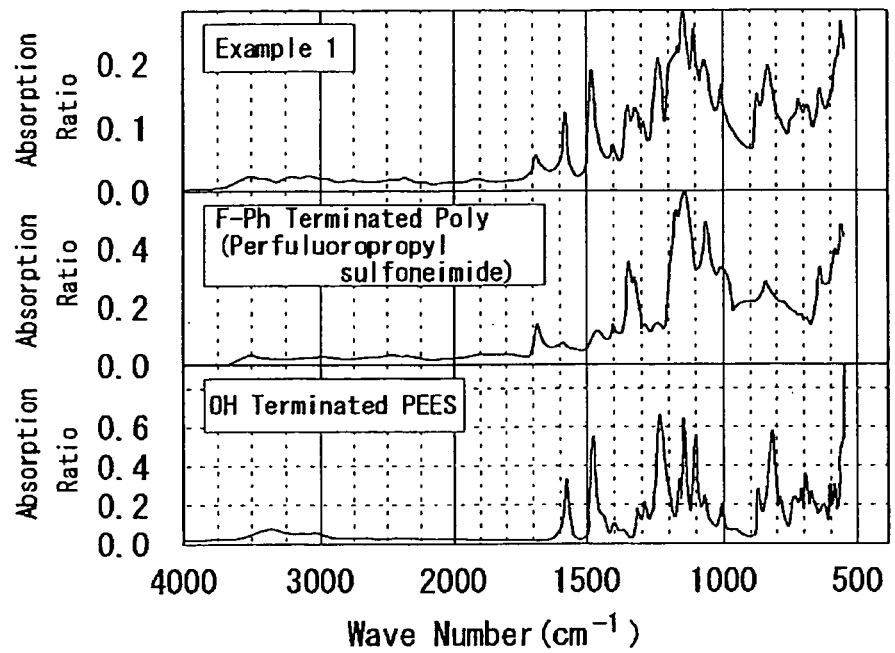
FIG. 1 illustrates IR spectra of OH terminated PEES, F-Ph terminated poly(perfluoropropyl sulfoneimide) and an electrolyte 1 obtained in Example 1.

An embodiment of the present invention will be described in detail.

1. Electrolyte

The electrolyte according to the present invention has a structure where a fluorinated hydrophilic segment A and a hydrocarbon hydrophobic segment B are alternately bonded to each other through chemical bond.

1.1 Hydrophilic Segment

In the present invention, the expression "fluorinated hydrophilic segment" means a segment that includes a C—F bond in a structure thereof, no C—H bond, and a proton conductive portion E in a structure thereof. The hydrophilic segment A has a structure represented by Formula (1).

$$A: -E_2-[Rf-E_1]_m- \qquad (1)$$

wherein Rf is a linear or a branched perfluoro chain having one or more carbon atoms, $E_1$, and $E_2$ are each a proton conductive portion represented by Formula

$(0 \leq i_1, 0 \leq i_2 \leq 1, 0 \leq i_3, 0 \leq i_4 \leq 1, 0 < i_1 + i_3,$ $i_1$ to $i_4$ are each an integer, and M is proton, alkali metal (Li, Na, K, Rb, Cs, and Fr), or alkali earth metal (Be, Mg, Ca, Sr, Ba, and Ra)), $2 \leq m$ (m is an integer), and Rf, $E_1$, and $E_2$ may be each arbitrarily selected in the repeating unit.

Rf is a linear or a branched perfluoro chain having one or more carbon atoms. The perfluoro chain means a divalent group that includes the C—F bond but not the C—H bond. When the electrolyte is synthesized by using one type of monomer having the same number of carbon atoms and the same molecular structure, each Rf included in the repeating unit mutually has the same number of carbon atoms and the same molecular structure. However, when two or more types of monomers having different numbers of carbon atoms or different molecular structures are used, each Rf included in the repeating unit may have the different numbers of carbon atoms or the different molecular structures for every repeating unit.

Rf includes a structure represented by the following Formula (1.1).

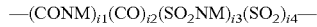

wherein p and q are an integer of 0 or more, p+q=2, r is an integer of 1 or more, and Rf' is a perfluoro alkyl chain or a perfluoro alkoxy chain.

The proton conductive portions $E_1$ and $E_2$ included in each repeating unit may be the same as each other, or may be different from each other for every repeating unit, according to the kind of monomer used to synthesize them.

It is particularly preferable that the proton conductive portions $E_1$ and $E_2$ included in the hydrophilic segment have the following structure among them shown the above Formula.

(1) —CONM-, —CONMCO—, —(CONM)$_{i1}$- ($2 \leq i_1$), —(CONM)$_{i1}$CO— ($2 \leq i_1$).

(2) —SO$_2$NM-, —SO$_2$NMSO$_2$—, —(SO$_2$NM)$_{i3}$- ($2 \leq i_3$), —(SO$_2$NM)$_{i3}$SO$_2$— ($2 \leq i_3$).

(3) —SO$_2$NMCO—, —(SO$_2$NM)$_{i3}$CO— ($2 \leq i_3$), —(CONM)$_{i1}$SO$_2$— ($2 \leq i_1$).

(4) —CONMSO$_2$NM-, —(CONM)$_{i1}$SO$_2$NM- ($2 \leq i_1$), —CONM(SO$_2$NM)$_{i3}$- ($2 \leq i_3$), —(CONM)$_{i1}$(SO$_2$NM)$_{i3}$- ($2 \leq i_1, 2 \leq i_3$).

(5) —CONMSO$_2$NMCO—, —(CONM)$_{i1}$SO$_2$NMCO— ($2 \leq i_1$), —CONM(SO$_2$NM)$_{i3}$CO— ($2 \leq i_3$), —(CONM)$_{i1}$(SO$_2$NM)$_{i3}$CO— ($2 \leq i_1, 2 \leq i_3$).

(6) —CONMSO$_2$NMSO$_2$—, —(CONM)$_{i1}$SO$_2$NMSO$_2$— ($2 \leq i_1$), —CONM(SO$_2$NM)$_{i3}$SO$_2$— ($2 \leq i_3$), —(CONM)$_{i1}$(SO$_2$NM)$_{i3}$SO$_2$— ($2 \leq i_1, 2 \leq i_3$).

In addition, in the present invention, the term "—SO$_2$NM-" includes "—NMSO$_2$—". This is the same as the case of other proton conductive portions $E_1$ and $E_2$ having an asymmetrical structure. Further, M is a proton, alkali metal (Li, Na, K, Rb, Cs, and Fr), or alkali earth metal (Be, Mg, Ca, Sr, Ba, and Ra). M is preferably Li, Na, K, Cs, Mg, Ca, Sr, and Ba.

The hydrophilic segment A includes a structure represented by the following Formula (1.2).

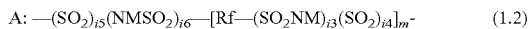

wherein $1 \leq i_3$, $i_4 = 0$ or $1$, $i_5 = 0$ or $1$, $1 \leq i_6$, and $2 \leq m$, Rf is a linear or a branched perfluoro chain having one or more carbon atoms and may be arbitrarily selected in the repeating unit, and M is proton, alkali metal (Li, Na, K, Rb, Cs, and Fr), or alkali earth metal (Be, Mg, Ca, Sr, Ba, and Ra).

It is preferable that the hydrophilic segment A has a structure represented by the following Formula (1.3) or (1.4).

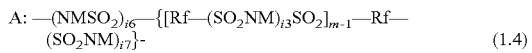

wherein $1 \leq i_3$, $1 \leq i_6$, $1 \leq i_7$, and $i_3$, $i_6$, and $i_7$ are integers.

Since Rf, m, and M are the same as those of Formula (1), they will not be described. In addition, M is preferably Li, Na, K, Cs, Mg, Ca, Sr, or Ba.

1.2 Hydrophobic Segment

In the present invention, the expression "hydrocarbon hydrophobic segment" means a segment that includes a C—H bond in a structure thereof, but no C—F bond and no proton conductive portion E in a structure thereof. However, E (Rf-E-Rf) being put between the C—F bonds acts as the proton conductive portion, but E not being put between the C—F bonds does not act as the proton conductive portion. Thus, the hydrophobic segment B may include E(R-E-R) being put between C—H bonds.

The hydrophobic segment B may be an aliphatic segment having a —(CH$_2$)$_b$— bond, or an aromatic segment where aromatic rings are bonded to each other through a direct bond or a divalent group. When the aliphatic segment is used in the hydrophobic segment B, the high mechanical strength of the electrolyte membrane may be obtained because of the desirable crystallinity of the aliphatic segment. In addition, when the aromatic segment is used in the hydrophobic segment B, heat resistance may be provided to the electrolyte membrane because of the high heat resistance of the aromatic segment.

When the hydrophobic segment B includes aliphatics on a main chain, examples of the aliphatics include vinyl polymer, polysulfoneamide, polysulfoneimide, polyamide, polyimide, polyether, polyurethane, polyurea, polyester, polycarbonate and the like. The hydrophobic segment B may include any one kind among them or may include two or more kinds.

Additionally, the hydrophobic segment B may include a structure in which the aromatic rings are bonded to each other through one or more selected from a sulfoneamide group, a sulfoneimide group, an amide group, an imide group, an ether group, a urethane group, a urea group, an ester group, and a carbonate group.

It is preferable that the hydrophobic segment B has a structure represented by Formula (2).

wherein Ar$_1$ and Ar$_2$ are each an allylene group,
Y is a direct bond, —O—, —S—, —SO$_2$— or —CO—,
$0 \leq n$ (n is an integer), and $Ar_1$, $Ar_2$, and Y may be each arbitrarily selected in the repeating unit.

The allylene groups $Ar_1$ and $Ar_2$ mean a divalent group that includes an aromatic ring or aromatic rings bonded to each other through a direct bond. The allylene groups $Ar_1$ and $Ar_2$ included in the repeating unit may be the same as each other, or may be different from each other for every repeating unit, according to the kind of monomer used to synthesize them.

Examples of the allylene groups $Ar_1$ and $Ar_2$ will be described below. The hydrophobic segment B may include any one kind of allylene group or may include two or more kinds thereof.

(1) benzene (—$C_6H_4$—), biphenyl (—$(C_6H_4)_2$—), terphenyl (—$(C_6H_4)_3$—), and tetraphenyl (—$(C_6H_4)_4$—).

(2) condensed rings such as naphthalene (—$C_{10}H_6$—), anthracene (—$C_{14}H_8$—), naphtahcene (—$C_{18}H_{10}$—), penthacene (—$C_{22}H_{12}$—), phenanthrene (—$C_{14}H_8$—), and pyrene (—$C_{16}H_8$—).

(3) heterocycles such as pyridine (—$C_5H_3N$—), pyradine (—$C_4H_2N_2$—), and pyrimidine (—$C_4H_2N_2$—).

(4) heterocycles such as benzoxidazole, benzothiazole, and benzoimidasol.

(5) heterocycles such as quinoline (—$C_9H_5N$—), isoquinoline (—$C_9H_5N$—), and quinoxaline (—$C_8H_4N_2$—).

(6) heterocycles such as carbazole, oxasol, oxathiazol, furane (—$C_4H_2O$—), thiophene (—$C_4H_2S$—), and pyrrole (—$C_4H_3N$—).

(7) polycyclic aromatics such as fluorene and stilbene.

(8) substitution derivatives of (1) to (7)

(9) structures in which two or more of (1) to (8) are bonded to each other through a direct bond.

Examples of the substitution derivatives include an aromatic ring (for example, a phenylene group and the like) that has any one of an alkyl group, an alkoxy group, an allyl group or an allyloxy group as a side chain.

1.3. Molecular Weight

The molecular weights of the hydrophilic segment A and the hydrophobic segment B are not particularly limited, and may be arbitrarily selected according to the purpose.

That is, the electrolyte according to the present invention may be a copolymer where a hydrophilic segment A having a relatively low molecular weight and a hydrophobic segment B having a relatively low molecular weight are alternately bonded to each other.

Additionally, the electrolyte according to the present invention may be a copolymer where a hydrophilic segment A having a relatively low molecular weight and a hydrophobic segment B having a relatively high molecular weight are alternately bonded to each other and vice versa.

Further, the electrolyte according to the present invention may be a block copolymer where a hydrophilic segment A having a relatively high molecular weight and a hydrophobic segment B having a relatively high molecular weight are alternately bonded to each other. The block copolymer may include any one of a diblock copolymer (A-B) that includes two segments, a triblock copolymer (A-B-A, B-A-B) that includes three segments, and a multiblock copolymer (-(A-B)$_n$-) that includes four or more segments.

In the electrolyte according to the present invention, if the molecular weight of the hydrophilic segment A is fixed to a predetermined value, and the molecular weight of the hydrophobic segment B is increased, when the molecular weight of the hydrophobic segment B approaches a critical value or more, the electrolyte is not dissolved in water. The molecular weight of the hydrophobic segment B to obtain the insolubleness of the electrolyte depends on the molecular weight of the hydrophilic segment A, the molecular structure and the like. In order to make the high proton conductivity and swelling resistance compatible, it is preferable that the molecular weight ($M_a$) of the hydrophilic segment A is relatively high and the ratio ($M_b/M_a$) of the molecular weight ($M_b$) of the hydrophobic segment B to $M_a$ is the critical value or more so that the electrolyte is not dissolved in water.

In addition, in the hydrophobic segment represented by Formula (2), a difference in the type of Y causes a difference in an agglomeration force between hydrophobic portions, and a difference in a structure of the hydrophobic segment causes a difference in the critical value of $M_b/M_a$ at which the electrolyte is not dissolved in water.

Further, in the present invention, the expression "monomer" means a compound having one subunit. Additionally, the expression "polymer" means a polymerized compound having high molecular weight equal to or higher than that of dimer.

2. Production Process for the Electrolyte

Next, the production process for the electrolyte according to the present invention will be described.

The process for producing the electrolyte according to the present invention includes a reaction step of reacting the monomer A or the polymer A and the monomer B or the polymer B, which satisfy a predetermined condition.

2.1 Monomer A or Polymer A

The polymer A means a polymer where functional groups are bonded to both ends of the fluorinated hydrophilic segment A or a polymer that is capable of forming the fluorinated hydrophilic segment A.

In addition, the monomer A means a monomer that is capable of forming the fluorinated hydrophilic segment A.

The monomer A and the polymer A may be used alone or while two kinds or more are combined with each other.

The fluorinated hydrophilic segment A is represented by the following Formula (1). Details of Formula (1) are the same as the above-mentioned description, thus they will be omitted.

$$A: -E_2-[Rf-E_1]_m- \qquad (1)$$

wherein Rf is a linear or a branched perfluoro chain having one or more carbon atoms, $E_1$, and $E_2$ are each a proton conductive portion represented by Formula $$-(CONM)_{i1}(CO)_{i2}(SO_2NM)_{i3}(SO_2)_{i4}-$$

($0 \leq i_1$, $0 \leq i_2 \leq 1$, $0 \leq i_3$, $0 \leq i_4 \leq 1$, $0 < i_1 + i_3$, $i_1$ to $i_4$ are each an integer, and M is proton, alkali metal (Li, Na, K, Rb, Cs, and Fr), or alkali earth metal (Be, Mg, Ca, Sr, Ba, and Ra)), $2 \leq m$, and Rf, $E_1$, and $E_2$ may be each arbitrarily selected in the repeating unit.

The kind of functional group that is bonded to both ends of the polymer A, or ends of the monomer A or the polymer A that is capable of forming the hydrophilic segment A is most suitably selected according to the kind of reaction used in the reaction step.

For example, when the electrolyte is synthesized by using the nucleophilic substitution reaction as described later, it is preferable that the functional group that is bonded to both ends of the polymer A, or the ends of the monomer A or the polymer A that is capable of forming the hydrophilic segment A are F, Cl, Br, I, OH, or SH.

In addition, when the electrolyte is synthesized by using the coupling reaction as described below, it is preferable that the functional group that is bonded to both ends of the polymer A, or the ends of the monomer A or the polymer A that is capable of forming the hydrophilic segment A are F, Cl, Br, I, —B(OH)$_2$, or cyclic boronic ester.

In addition, for example, when the electrolyte is synthesized by using the condensation reaction as described later, it is preferable that the functional group that is bonded to both ends of the polymer A is an amide group or a derivative thereof (hereinafter, referred to as "amide functional group") or, a halide group or a derivative thereof (hereinafter, referred to as "halide functional group"). Like this, it is preferable that the ends of the monomer A or the polymer A that is capable of forming the hydrophilic segment A are the amide functional group or the halide functional group.

Here, the amide functional group means a functional group represented by Formula: —SO$_2$NZ$_1$Z$_2$, —CONZ$_1$Z$_2$ or —NZ$_1$Z$_2$. Z$_1$ and Z$_2$ are each H, M or SiMe$_3$. In addition, M is alkali metal (Li, Na, K, Rb, Cs, and Fr) ions or alkali earth metal (Be, Mg, Ca, Sr, Ba, and Ra) ions. In particular, the amide functional group in which the combination of (Z$_1$, Z$_2$) includes (H, H), (H, M), (SiMe$_3$, M) or (H, SiMe$_3$) is preferable, because it has high reactivity.

The halide functional group means a functional group represented by Formula: —SO$_2$X or —COX. X is F, Cl, Br or I. In particular, the halide functional group in which X includes F or Cl is preferable in views of high reactivity and handling.

First examples of the polymer A are polymers represented by the following Formula (3.1). The polymer A represented by Formula (3.1) may be used in the nucleophilic substitution reaction or the coupling reaction.

$$T_1\text{-}Ar_3\text{-}E_2\text{-}[Rf\text{-}E_1]_m\text{-}Ar_4\text{-}T_2 \quad (3.1)$$

wherein Rf is a linear or a branched perfluoro chain having one or more carbon atoms, E$_1$, and E$_2$ are each a proton conductive portion represented by Formula

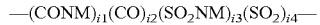

$$-(CONM)_{i1}(CO)_{i2}(SO_2NM)_{i3}(SO_2)_{i4}-$$

(0≦i$_1$, 0≦i$_2$≦1, 0≦i$_3$, 0≦i$_4$≦1, 0<i$_1$+i$_3$, i$_1$ to i$_4$ are each an integer, and M is proton, alkali metal (Li, Na, K, Rb, Cs, and Fr), or alkali earth metal (Be, Mg, Ca, Sr, Ba, and Ra)), 2≦m, T$_1$ and T$_2$ are each F, Cl, Br, I, OH, SH, —B(OH)$_2$ or cyclic boronic ester, Ar$_3$ and Ar$_4$ are each an allylene group, and Rf, and E$_1$ may be each arbitrarily selected in the repeating unit.

Second examples of the monomer A or the polymer A are monomers or polymers represented by the following Formula (3.2). The monomer A or the polymer A represented by Formula (3.2) may be used in the condensation reaction.

$$T_3\text{-}[Rf\text{-}E_1]_{m'}\text{-}Rf''\text{-}T_4 \quad (3.2)$$

wherein Rf is a linear or a branched perfluoro chain having one or more carbon atoms, E$_1$ is a proton conductive portion represented by Formula —(CONM)$_{i1}$(CO)$_{i2}$(SO$_2$NM)$_{i3}$(SO$_2$)$_{i4}$— (0≦i$_1$, 0≦i$_2$≦1, 0≦i$_3$, 0≦i$_4$≦1, 0<i$_1$+i$_3$, i$_1$ to i$_4$ are each an integer, and M is proton, alkali metal (Li, Na, K, Rb, Cs, and Fr), or alkali earth metal (Be, Mg, Ca, Sr, Ba, and Ra)), 0≦m', Rf'' is a linear or a branched perfluoro chain having one or more carbon atoms, T$_3$ and T$_4$ are each —NZ$_1$Z$_2$, —SO$_2$NZ$_1$Z$_2$, —SO$_2$X, —CONZ$_1$Z$_2$ or —COX (Z$_1$ and Z$_2$ are each H, M, SiMe$_3$ M is alkali metal (Li, Na, K, Rb, Cs, and Fr) or alkali earth metal (Be, Mg, Ca, Sr, Ba, and Ra), and X is halogen), and Rf, and E$_1$ may be each arbitrarily selected in the repeating unit.

2.2 Process for Producing the Monomer A or the Polymer A

The monomer A represented by Formula (3.2) may be sold on the market or may be synthesized by a known method for converting a functional group using a commercial compound having the similar molecular structure as a starting raw material.

Furthermore, the polymer A represented by Formula (3.2) may be synthesized by a condensation reaction using the monomer A represented by Formula (3.2) (m'=0) as a starting raw material.

The following Formulas (3.2.1) to (3.2.4) illustrate examples of synthesis reaction formula of various polymers A including an amide functional group at an end thereof. X is halogen.

In both cases, the polymer A including the amide functional group at an end thereof may be obtained by reacting monomers in the presence of base and reacting them with an excess amount of amide monomer or NH$_3$. In addition, "m" in the Formula may be controlled by "a" and "b" in the Formula, and reaction time and temperature.

[Chemical Formula 1]

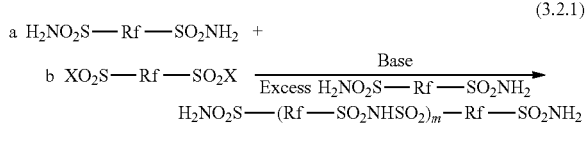

(3.2.1)
a H$_2$NO$_2$S—Rf—SO$_2$NH$_2$ +
b XO$_2$S—Rf—SO$_2$X $\xrightarrow{\text{Base}}_{\text{Excess H}_2\text{NO}_2\text{S—Rf—SO}_2\text{NH}_2}$
H$_2$NO$_2$S—(Rf—SO$_2$NHSO$_2$)$_m$—Rf—SO$_2$NH$_2$

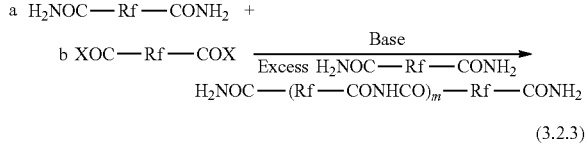

(3.2.2)
a H$_2$NOC—Rf—CONH$_2$ +
b XOC—Rf—COX $\xrightarrow{\text{Base}}_{\text{Excess H}_2\text{NOC—Rf—CONH}_2}$
H$_2$NOC—(Rf—CONHCO)$_m$—Rf—CONH$_2$

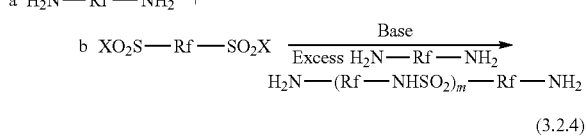

(3.2.3)
a H$_2$N—Rf—NH$_2$ +
b XO$_2$S—Rf—SO$_2$X $\xrightarrow{\text{Base}}_{\text{Excess H}_2\text{N—Rf—NH}_2}$
H$_2$N—(Rf—NHSO$_2$)$_m$—Rf—NH$_2$

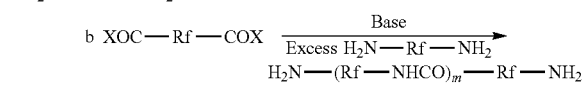

(3.2.4)
a H$_2$N—Rf—NH$_2$ +
b XOC—Rf—COX $\xrightarrow{\text{Base}}_{\text{Excess H}_2\text{N—Rf—NH}_2}$
H$_2$N—(Rf—NHCO)$_m$—Rf—NH$_2$ This is the same as the case of the polymer A having another proton conductive portion E, and the polymer A having the above proton conductive portion E$_1$ may be obtained by condensation reacting a monomer or a polymer having a —SO$_2$X group or a —COX group at an end thereof and a monomer or a polymer having a —SO$_2$NZ$_1$Z$_2$ group, a —CONZ$_1$Z$_2$ group or a —NZ$_1$Z$_2$ group at an end thereof.

In addition, at this time, the polymer A having the proton conductive portion E, in which any one or both of i$_1$ or i$_3$ is 2 or more, may be synthesized by using additional monomers including:

(1) XO$_2$SNMSO$_2$X, H$_2$NO$_2$SNMSO$_2$NH$_2$, XOCNMCOX, and H$_2$NCONMCONH$_2$ (M is proton, alkali metal (Li, Na, K, Rb, Cs, and Fr), or alkali earth metal (Be, Mg, Ca, Sr, Ba, and Ra), and X is halogen), (2) $H_2NSO_2X$, and $H_2NCOX$ (X is halogen),
(3) $H_2NCONH_2$, and $H_2NSO_2NH_2$,
(4) $COX_2$, and $SO_2X_2$ (X is halogen).

Formulas (3.2.5) to (3.2.10) illustrate an example of the synthesis reaction formula.

[Chemical Formula 2]

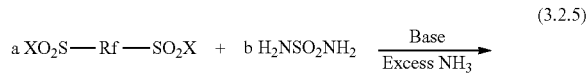

(3.2.5)

(3.2.6)

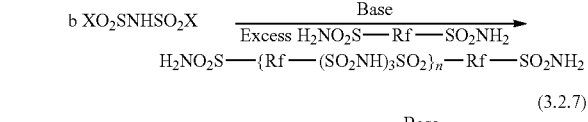

(3.2.7)

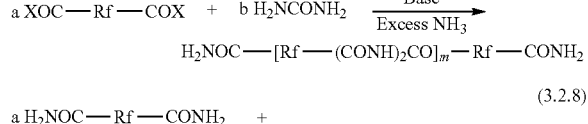

(3.2.8)

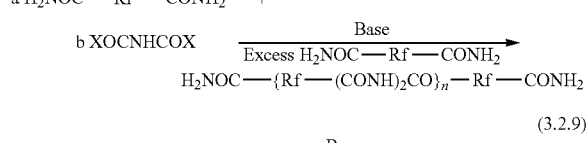

(3.2.9)

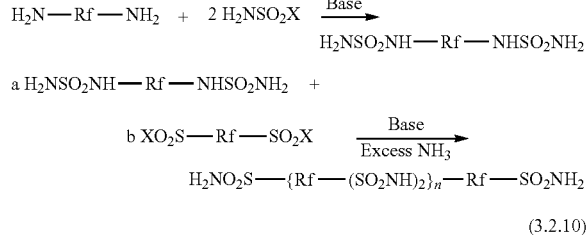

(3.2.10)

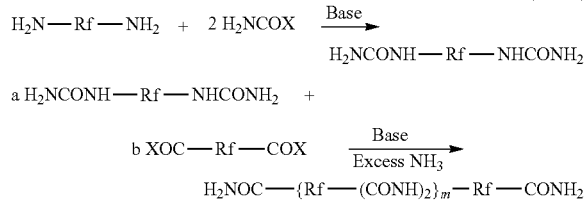

Furthermore, the polymer A represented by Formula (3.1) may be synthesized by adding a functional group having an appropriate molecular structure to an end of the polymer A represented by Formula (3.2) using the condensation reaction and the like.

Formula (3.1.1) illustrates an example of the synthesis reaction. X is halogen.

[Chemical Formula 3]

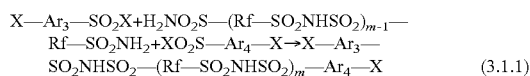

(3.1.1)

In both cases, if only a raw material in which Rf and the functional group of the end thereof are equivalent is used, the polymer A in which each Rf and $E_1$ in the repeating unit are identical may be obtained.

Meanwhile, if two or more kinds of raw materials in which Rf or the functional group of the end thereof are different from each other are used, the polymers A in which each Rf and $E_1$ in the repeating unit are different from each other may be obtained.

2.3 Monomer B or Polymer B

The polymer B means a polymer where functional groups are bonded to both ends of the hydrocarbon hydrophobic segment B.

The monomer B means a monomer that is capable of forming the hydrophobic segment B.

The monomer B and the polymer B may be used alone or while two kinds or more are combined with each other.

The kind of functional group that is bonded to both ends of the polymer B, or ends of the monomer B or the polymer B that is capable of forming the hydrophobic segment B is most suitably selected according to the kind of reaction used in the reaction step.

In respects to the functional group of the end of the polymer B and the structure of the end of the monomer B or the polymer B that is capable of forming the hydrophobic segment B, since they are the same as the functional group of the end of the polymer A and the structure of the end of the monomer A or the polymer A that is capable of forming the hydrophilic segment A, they will not be described.

First examples of the monomer B or polymer B are represented by the following Formula (4.1). The monomer B or the polymer B represented by Formula (4.1) may be used in any one of the condensation reaction, the nucleophilic substitution reaction, and the coupling reaction according to the structure of $S_1$ and $S_2$.

$$S_1-(Ar_1-Y)_n-Ar_2-S_2 \quad (4.1)$$

wherein $Ar_1$ and $Ar_2$ are each an allylene group,

Y is a direct bond, —O—, —S—, —$SO_2$— or —CO—, $0 \leq n$ (n is an integer), $S_1$ and $S_2$ are each —OH, —SH, —$B(OH)_2$, cyclic boronic ester, —$NZ_1Z_2$, —$SO_2NZ_1Z_2$, —$SO_2X$, —$CONZ_1Z_2$, —COX, F, Cl, Br or I ($Z_1$ and $Z_2$ are each H, M, or $SiMe_3$, M is alkali metal (Li, Na, K, Rb, Cs, and Fr) or alkali earth metal (Be, Mg, Ca, Sr, Ba, and Ra), and X is halogen or OH), and $Ar_1$, and Y may be each arbitrarily selected in the repeating unit.

Second examples of the monomer B include monomers represented by the following Formulas (4.2) to (4.3). The monomer B represented by Formulas (4.2) to (4.3) corresponds to the case of when n is 0 or 1 in Formula (4.1), and it is a monomer that is capable of forming the hydrophobic segment B by using the nucleophilic substitution reaction or the coupling reaction.

$$S_3-Ar_5-S_4 \quad (4.2)$$

$$S_5-Ar_6-Y'-Ar_7-S_6 \quad (4.3)$$

wherein $Ar_5$, $Ar_6$, and $Ar_7$ are each an allylene group, $S_3$ to $S_6$ are each halogen, OH or SH, and Y' is —O—, —S—, $SO_2$— or —CO—.

2.4 Process for Producing the Monomer B or the Polymer B

The monomer B represented by Formulas (4.2) to (4.3) may be sold on the market or may be synthesized by a known method for converting a functional group using a commercial compound having the similar molecular structure as a starting raw material.

Furthermore, the polymer B represented by Formula (4.1) may be synthesized by the nucleophilic substitution reaction or the coupling reaction using the monomer B represented by Formulas (4.2) to (4.3) as a starting raw material.

The following Formulas (4.1.1) to (4.1.3) illustrate an example of synthesis reaction (nucleophilic substitution reaction) using the monomer B where $S_3$ and $S_4$ are OH and $S_5$ and $S_6$ are X (halogen).

[Chemical Formula 4]

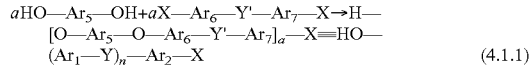
(4.1.1)

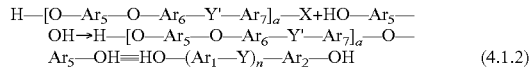
(4.1.2)

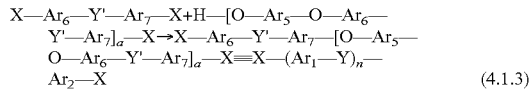
(4.1.3)

This is the same as the case of the polymer B having another structure, and the polymer B may be obtained by polymerization according to the nucleophilic substitution reaction or the coupling reaction while using compounds having a relatively simple structure such as that represented by Formulas (4.2) to (4.3) as a starting raw material.

In addition, in both cases, if only a raw material in which Ar, Y, the functional group of the end thereof and the like are equivalent is used, the polymer B in which each Ar and Y in the repeating unit are identical may be obtained.

Meanwhile, if two or more kinds of raw materials in which Ar, Y, the functional group of the end thereof and the like are different from each other are used, the polymers B in which each Ar and/or Y in the repeating unit are different from each other may be obtained.

In addition, examples of the monomer B or the polymer B in addition to Formulas (4.1) to (4.3) include, among monomers that are capable of being used in a known polymerization method (radical polymerization, anion polymerization, cation polymerization, coordination polymerization, addition polymerization (hydrogen-transfer polymerization is included), polycondensation, ring-opening polymerization (metatehsis polymerization), oxidation polymerization, group-transfer polymerization, optical solid phase polymerization, polymerization by Diels-Alder reaction, coupling polymerization, electrolytic polymerization and the like) or polymers that are synthesized by the above polymerization methods, (1) monomer B having a substituent group (for example, OH, halogen, an amide functional group, a halide functional group and the like) that is capable of forming a chemical bond along with the monomer A or the polymer A, and (2) polymer B having a substituent group (for example, OH, halogen, an amide functional group, a halide functional group and the like) that is capable of forming a chemical bond along with the monomer A or the polymer A at an end thereof.

2.5 Reaction Method

As a method for obtaining the electrolyte according to the present invention, there are the following methods.

(1) the method for reacting the monomer A and the monomer B.

(2) the method for reacting the monomer A and the polymer B.

(3) the method for reacting the polymer A and the monomer B.

(4) the method for reacting the polymer A and the polymer B.

As described above, in order to make the high proton conductivity and swelling resistance compatible, it is preferable that the molecular weight ($M_a$) of the hydrophilic segment A is relatively high and the ratio ($M_b/M_a$) of the molecular weight ($M_b$) of the hydrophobic segment B to $M_a$ is the critical value or more so that the electrolyte is not dissolved in water. In order to synthesize the electrolyte, it is preferable that the methods of (2) to (4) are used.

As a method for bonding the monomer A or the polymer A to the monomer B or the polymer B, there are a condensation reaction, a nucleophilic substitution reaction, and a coupling reaction.

Formula (5.1) illustrates an example of the condensation reaction of the polymer A represented by Formula (3.2) and the polymer B represented by Formula (4.1). In this case, it is preferable that the amide functional group is used as $T_3$ and $T_4$ and the halide functional group is used as $S_1$ and $S_2$, and vice versa.

In this case, it is preferable that the condensation reaction of the functional groups $T_1$ and $T_2$ and the functional groups $S_1$ and $S_2$ is performed in the presence of base. If the condensation reaction is performed in the presence of base, the condensation reaction may be promoted. Examples of the base include triethylamine, trimethylamine, tripropylamine, tributylamine, DBU (diazabycycloundecene), metal alkoxide and the like. This is the same as the case of when the polymer A is synthesized by using the condensation reaction.

In addition, Formula (5.2) illustrates an example of the nucleophilic substitution reaction of the polymer A represented by Formula (3.1) and the polymer B represented by Formula (4.1). In this case, it is preferable that halogen is used as $T_1$ and $T_2$ and OH and SH are used as $S_1$ and $S_2$, and vice versa.

In addition, Formula (5.3) illustrates an example of the coupling reaction of the polymer A represented by Formula (3.1) and the polymer B represented by Formula (4.1). In this case, it is preferable that halogen is used as $T_1$ and $T_2$ and halogen, boronic acid and cyclic boronic ester are used as $S_1$ and $S_2$, and vice versa.

When the electrolyte is synthesized by using the coupling reaction, the coupling reaction is performed in the presence of a catalyst and a reducing agent. In the catalyst, it is preferable that a transition metal such as Cu, Pd, Ni and the like is used. When the coupling is performed under Ni or Cu, it is preferable that the combination of the functional groups (T, S) is (halogen, halogen). Meanwhile, when the coupling is performed under Pd, it is preferable that the combination of the functional groups (T, S) is (halogen, boronic acid), (halogen, cyclic boronic ester), (boronic acid, halogen) or (cyclic boronic ester, halogen).

In addition, it is preferable that metal such as Zn and the like is used as the reducing agent or salts such as NaI, $Et_4NI$ and the like are added in order to promote the reaction.

This is the same as the case of when the polymer B is synthesized by using the coupling reaction.

[Chemical Formula 5]

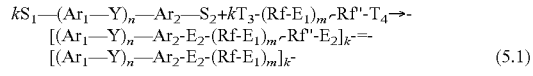
(5.1)

wherein $S_1$, $S_2$: a halide functional group, $T_3$, $T_4$: an amide functional group or $S_1$, $S_2$: an amide functional group, $T_3$, $T_4$: a halide functional group.

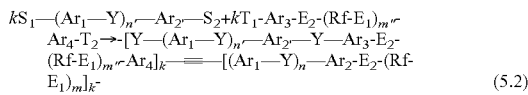

(5.2)

wherein $T_1$, $T_2$: halogen, $S_1$, $S_2$: OH, SH or
$T_1$, $T_2$: OH, SH, $S_1$, $S_2$: halogen.

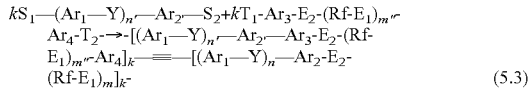

(5.3)

wherein $T_1$, $T_2$: halogen
$S_1$, $S_2$: halogen, boronic acid or cyclic boronic ester or
$T_1$, $T_2$: halogen, boronic acid or cyclic boronic ester
$S_1$, $S_2$: halogen In addition, for example, by using the monomer A of the left column of Formulas (3.2.1) to (3.2.10) and the polymer B represented by Formula (4.1) ($S_1$ and $S_2$ are the amide functional group or the halide functional group), the electrolyte may be synthesized by a condensation reaction.

Alternatively, by using the polymer A represented by Formula (3.1) or (3.2) and the monomer B represented by Formula (4.2) or (4.3), the electrolyte may be synthesized by a nucleophilic substitution reaction or the coupling reaction.

In addition, by reacting the monomer B or the polymer B (the monomer used in the known polymerization reaction mentioned above or the polymer obtained therefrom) in addition to Formulas (4.1) to (4.3) and the monomer A or polymer A, the electrolyte may be synthesized by using the same method.

For example, Formula (6.1) illustrates an example of the electrolyte that is obtained by reacting the monomer B that is capable of forming the aliphatic hydrocarbon polymer (polyamide) including no aromatic ring and the polymer A represented by Formula (3.1).

In addition, Formula (6.2) illustrates an example of the electrolyte that is obtained by reacting the aliphatic hydrocarbon polymer B (polyamide) including no aromatic ring and the polymer A represented by Formula (3.1).

In addition, Formula (6.3) illustrates an example of the electrolyte that is obtained by reacting the aliphatic hydrocarbon polymer B (vinyl polymer) including no aromatic ring on a main chain and the polymer A represented by Formula (3.1).

[Chemical Formula 6]

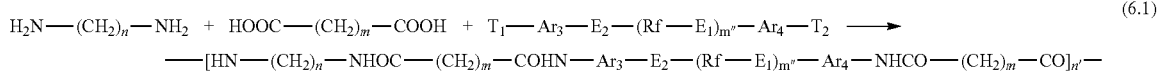

(6.1)

wherein $T_1$ and $T_2$ are an amide functional group ($NH_2$)

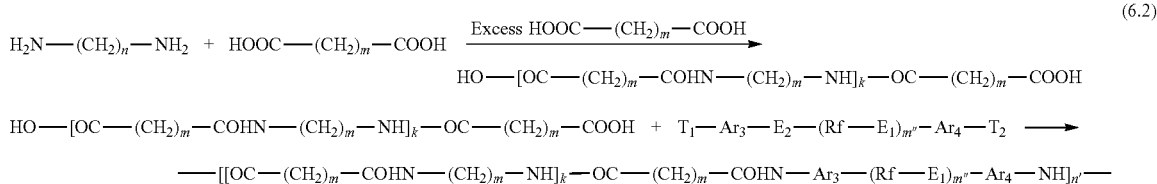

(6.2)

wherein $T_1$ and $T_2$ are an amide functional group ($NH_2$)

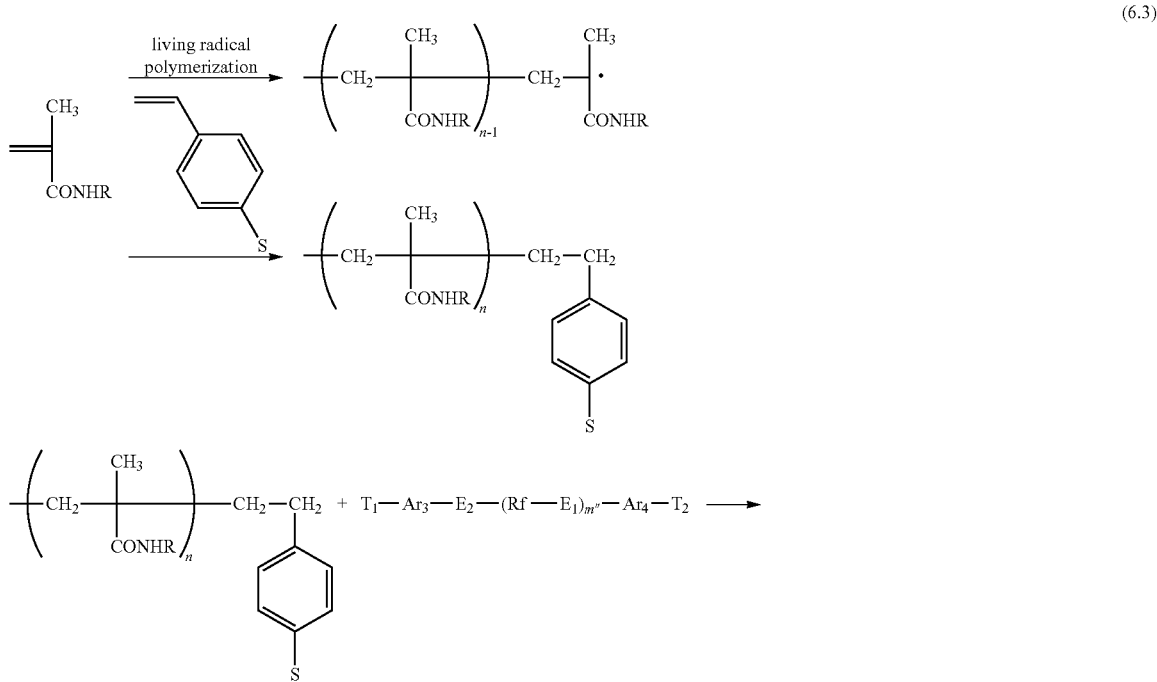

(6.3)

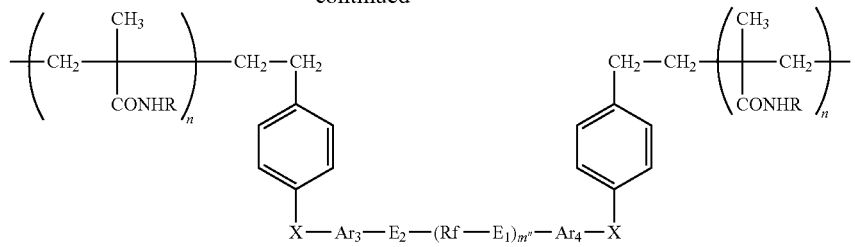

wherein when S is halogen, $T_1$ and $T_2$ are OH, SH, X = O, S
when S is OH or SH, $T_1$ and $T_2$ are halogen, X = O, S
when S is an amide functional group, $T_1$ and $T_2$ are a halide functional group, X = E
when S is a halide functional group, $T_1$ and $T_2$ are an amide functional group, X = E
R is an alkyl group.

In addition, Formula (6.4) illustrates an example of the electrolyte that is obtained by reacting the hydrocarbon polymer B (polyimide) including an aromatic ring on a main chain and the monomer A represented by Formula (3.2).

In addition, Formula (6.5) illustrates an example of the electrolyte that is obtained by reacting the aliphatic hydrocarbon polymer B (polyether) including no aromatic ring on a main chain and the monomer A represented by Formula (3.2).

In addition, Formula (6.6) illustrates an example of the electrolyte that is obtained by reacting the hydrocarbon polymer B (polyurethane) including an aliphatic chain or an aromatic ring on a main chain and the polymer A represented by Formula (3.1).

In addition, Formula (6.7) illustrates an example of the electrolyte that is obtained by reacting the hydrocarbon polymer B (polyurea) including an aliphatic chain or an aromatic ring on a main chain and the polymer A represented by Formula (3.1).

[Chemical Formula 7]

(6.4)

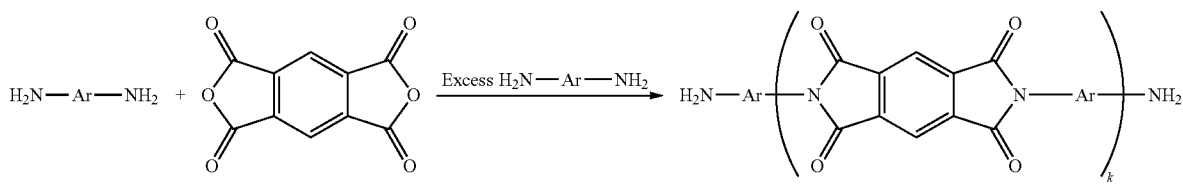

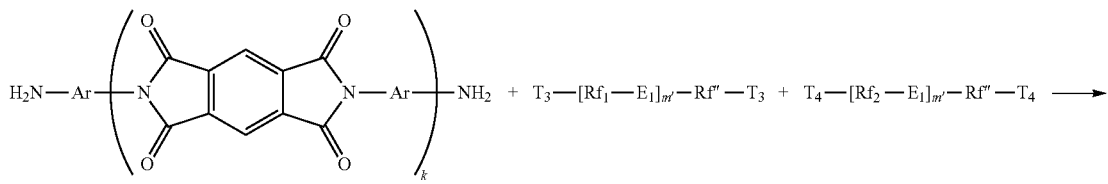

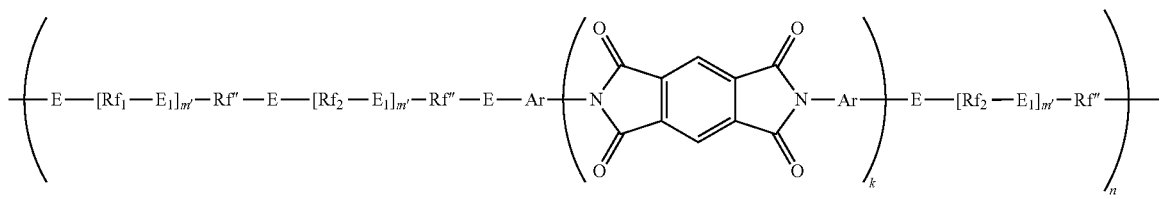

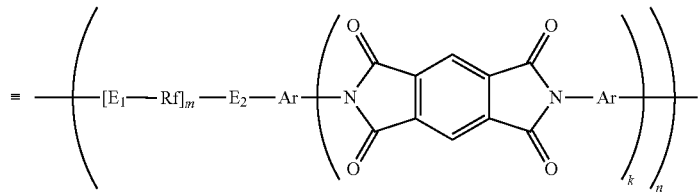

wherein $T_3$ is an amide functional group, $T_4$ is a halide functional group

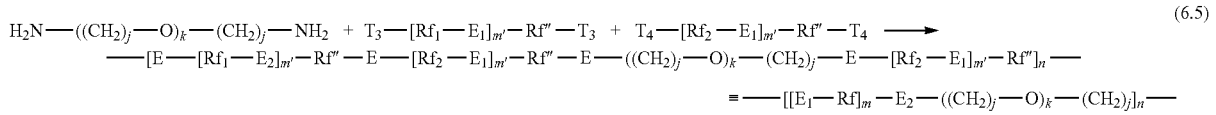

(6.5)

wherein $T_3$ is an amide functional group, $T_4$ is a halide functional group, $j \geq 3$

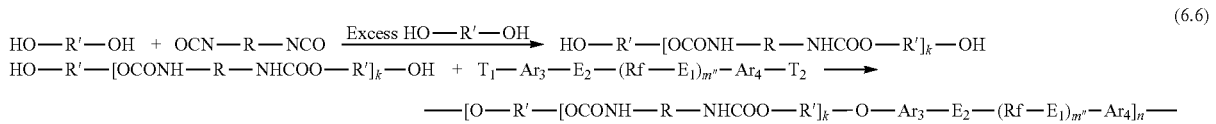

(6.6)

wherein $T_1$ and $T_2$ are halogen
R' and R are an aliphatic chain or an aromatic ring

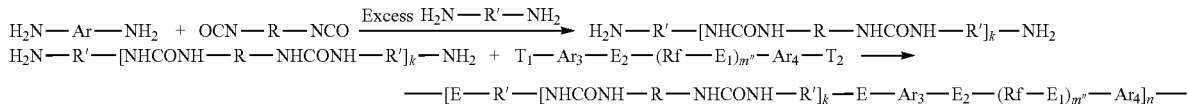

wherein $T_1$ and $T_2$ are a halide functional group
R' and R are an aliphatic chain or an aromatic ring In addition, Formula (6.8) illustrates an example of the electrolyte that is obtained by reacting the hydrocarbon polymer B (polyester) including an aliphatic chain and an aromatic ring on a main chain and the polymer A represented by Formula (3.1).

In addition, Formula (6.9) illustrates an example of the electrolyte that is obtained by reacting the hydrocarbon polymer B (polycarbonate) including an aliphatic chain and an aromatic ring on a main chain and the polymer A represented by Formula (3.1).

In addition, Formula (6.10) illustrates an example of the electrolyte that is obtained by reacting the hydrocarbon polymer B (polysulfoneamide) including an aliphatic chain or an aromatic ring on a main chain and the polymer A represented by Formula (3.1).

In addition, Formula (6.11) illustrates an example of the electrolyte that is obtained by reacting the hydrocarbon polymer B (polysulfoneimide) including an aliphatic chain or an aromatic ring on a main chain and the polymer A represented by Formula (3.1).

[Chemical Formula 8]

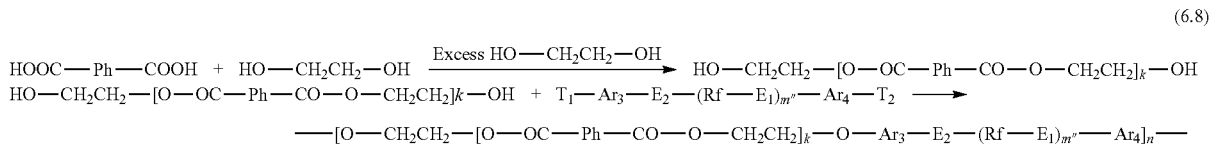

(6.8)

wherein $T_1$ and $T_2$ are halogen

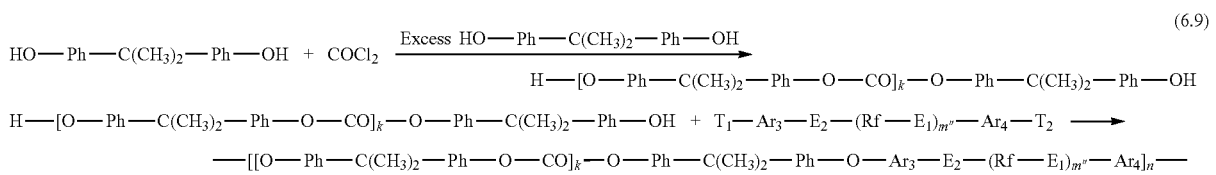

(6.9)

wherein $T_1$ and $T_2$ are halogen (6.10)
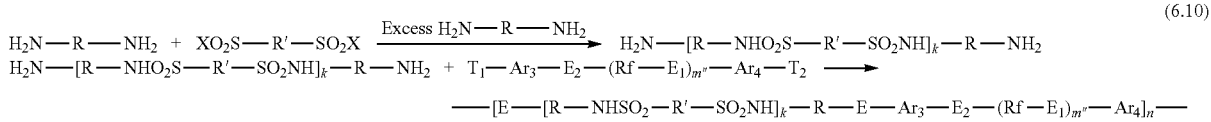

wherein $T_1$ and $T_2$ are a halide functional group
R' and R are an aliphatic chain or an aromatic ring (6.11)
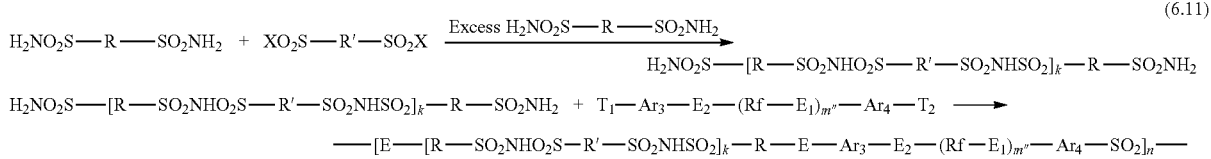

wherein $T_1$ and $T_2$ are a halide functional group
R' and R are an aliphatic chain or an aromatic ring The obtained electrolyte may be used as electrolyte membranes or electrolytes in catalyst layers for electrochemical devices such as fuel cells. In addition, by forming a complex of the electrolyte according to the present invention and the porous material, this may be used as an electrolyte membrane.

3. Process for Producing an Electrolyte Membrane

The electrolyte membrane may be manufactured by dissolving a synthesized electrolyte in a predetermined solvent, casting the solution on the surface of the substrate, and removing the solvent. In addition, the electrolyte membrane that includes the complex of the electrolyte and the porous material may be manufactured by dissolving a synthesized electrolyte in a predetermined solvent, charging the solution in the porous material, and removing the solvent.

As the solvent that dissolves the electrolyte, a single solvent that is capable of dissolving the entire electrolyte may be used, or a mixture of two or more solvents that have different solubilities, boiling points and the like may be used.

When the solvent is a mixed solvent that includes at least a solvent A and a solvent B, the combination may be appropriately selected according to the purpose.

For example, the mixed solvent may be a mixture that includes a solvent A that is capable of dissolving both the hydrophilic segment and hydrophobic segment of the electrolyte, and a solvent B that is capable of dissolving only the hydrophobic segment of the electrolyte.

In addition, the mixed solvent may be a mixture that includes a solvent A that is capable of dissolving both the hydrophilic segment and hydrophobic segment of the electrolyte, and a solvent B that does not dissolve any of the hydrophilic segment and hydrophobic segment of the electrolyte.

In addition, the mixed solvent may be a mixture that includes a solvent A that has high affinity to the hydrophilic segment of the electrolyte, and a solvent B that has high affinity to the hydrophobic segment of the electrolyte as compared to the solvent A.

In the mixed solvent, it is preferable that a boiling point difference between the solvent A and the solvent B is less than 37° C. If the boiling point difference between the solvent A and the solvent B is excessively high, when the mixed solvent is vaporized, since any one of solvents is first vaporized, the same effect as use of the single solvent may be obtained. Meanwhile, when the boiling point difference is reduced, excellent membrane manufacturing properties may be obtained, and the hydration swelling may be suppressed while the conductivity is not reduced. It is more preferable that the boiling point difference between the solvent A and the solvent B is 9° C. or less.

In addition, in the case of the mixed solvent that includes the solvent A having high affinity to the hydrophilic segment and the solvent B having high affinity to the hydrophobic segment, it is more preferable that the boiling point of the solvent B is higher than the boiling point of the solvent A. If the boiling point of the solvent B is higher, since the solvent A is first volatilized, excellent membrane manufacturing properties may be obtained and the hydration swelling may be suppressed while conductivity is not reduced.

Examples of the solvent that is capable of dissolving both the hydrophilic segment and hydrophobic segment of the electrolyte include dimethyl sulfoxide (DMSO), N,N-dimethyl acetamide (DMAc), dimethyl formamide (DMF), N-methyl-pyrolydine (NMP) and the like.

Examples of the solvent that is capable of dissolving only the hydrophobic segment of the electrolyte include p-cresol and the like.

Examples of the solvent that does not dissolve any of the hydrophobic segment and hydrophilic segment of the electrolyte include benzene, chloroform, o-Dichlorobenzene, 1,4-dioxane, diethyl ether, hexane and the like.

In particular, it is preferable to use a mixture of p-cresol and NMP or a mixture of o-dichlorobenzene and DMSO as the mixed solvent.

If the mixed solvent satisfying the above conditions is used, excellent membrane manufacturing properties may be obtained, and the hydration swelling may be suppressed while the conductivity is not reduced. This is deemed because by using the mixed solvent, formation of an islands-sea structure where islands of the hydrophilic segment are formed in the sea of the hydrophobic segment is promoted, thus the hydrophobic segment suppresses the hydration swelling pressure of the hydrophilic segment from surroundings. In addition, even though the mixed solvent includes two or more solvents that are relatively small in views of a boiling point difference, the same effect may be obtained by using the mixed solvent. This is deemed because a difference between affinities of the solvents to the hydrophobic segment or hydrophilic segment results in a difference between vaporization speeds.

4. Effect of the Electrolyte and the Production Process Therefor

Since the electrolyte according to the present invention uses the fluorinated segment having the high ion exchange capacity to the hydrophilic segment, it may maintain the high proton conductivity at low humidity and have the high chemical durability.

Meanwhile, in general, the hydrocarbon electrolyte has poor oxidation resistance. However, in the electrolyte according to the present invention, even though the hydrophobic segment is hydrocarbon, the oxidation resistance is high. This is deemed because the hydrophilic segment and the hydrophobic segment are separated in a microphase. Since the electrolyte according to the present invention includes the hydrophilic segment that is made of the fluorinated segment and the hydrophobic segment that is made of the hydrocarbon segment, it is easy to perform phase separation as compared to a known electrolyte. Since the hydroxy radical that degrades the electrolyte membrane is present in a water cluster, by forming the microphase separation, the hydroxy radical is present in only the hydrophilic segment, and there is a low possibility of attacking of the hydroxy radical to the hydrophobic segment.

In particular, when the hydrophilic segment and the hydrophobic segment both of which have a predetermined molecular weight or more are block copolymerized, since an apparent microphase separation structure is ensured, there is a low possibility of attacking of the hydrogen peroxide or hydroxy radical to the hydrophobic segment. In addition, even if the hydrophobic segment is oxidized, since the hydrophobic segment does not include fluorine, a load to environment is small. In addition, if a ratio of the molecular weight of the hydrophobic segment to the hydrophilic segment is increased to a predetermined value or more, the membrane may be made insoluble.

In addition, since the hydrocarbon polymer generally has low free volume, by using the hydrocarbon segment in the hydrophobic segment, the gas barrier property of the electrolyte membrane is improved.

In addition, since the electrolyte membrane that includes only the hydrocarbon polymer generally has a high glass transition temperature (Tg), there is a problem in that the heat resistance is high but the membrane is hard. In respects to this, if a soft fluorinated segment (low Tg) is used as the hydrophilic segment, flexibility may be provided to the membrane.

Therefore, if it is applied to an electrolyte membrane, an electrolyte in a catalyst layer and the like of a fuel cell, the fuel cell that is low-priced and has excellent durability may be obtained.

EXAMPLES

Examples 1 to 3

Comparative Example 1

1. Manufacturing of the Sample 1.1 Synthesis of the Hydrophobic Segment 1.1.1 Synthesis of OH Terminated PEES (poly(etherethersulfone))

To a 500 mL three-neck flask to which the Dean-Stark tube and the three-way cock were connected, bisphenol: 7.17 g (38.5 mmol), bis-(4-chlorophenyl)sulfone: 10 g (34.8 mmol), and $K_2CO_3$: 24.3 g (176 mmol) were added, and they were dried for 1 hour under vacuum.

Commercial dehydrated DMAc: 120 mL and toluene: 120 mL were added thereto, and heated at 100° C. for 1 hour. Subsequently, the temperature was slowly increased to 165° C., the generated water and toluene were in an azeotropic state, and water was removed along with toluene from the reaction system. In addition, after they were reacted for 7 days at 165° C., an excess amount of bisphenol: 12.9 g (69 mmol) was added, and the reaction was performed at the same temperature for 2 days. After the reaction was carried out, the precipitated inorganic salts were filtered. The polymerization solution was reprecipitated in ethanol and dried under vacuum for overnight to obtain OH terminated PEES (h=2.2) (yield 32%, 4.7 g). The following Formula (a.1) illustrates synthesis scheme of the OH terminated PEES.

In addition, by changing the molar ratio of bisphenol and bis-(4-chlorophenyl)sulfone using the same method as the above synthesis method, OH terminated PEES (h=4.0), OH terminated PEES (h=6.7), OH terminated PEES (h=12), and OH terminated PEES (h=15) were obtained.

[Chemical Formula 9]

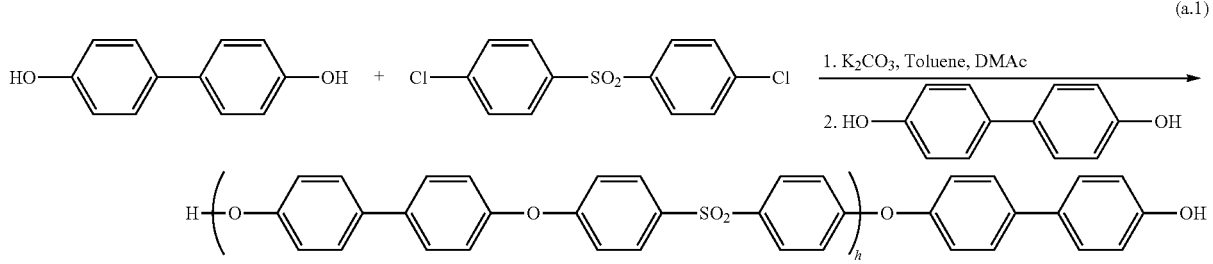

(a.1)

1.1.2 Synthesis of Cl Terminated PEES

To a 100 mL two-neck recovery flask to which the Dean-Stark tube and the three-way cock were connected, bisphenol: 2.05 g (11 mmol), bis-(4-chlorophenyl)sulfone: 3.5 g (12 mmol), and K₂CO₃: 4.56 g (33 mmol) were added, and they were dried for 1 hour under vacuum.

Commercial dehydrated DMAc: 40 mL and toluene: 40 mL were added thereto, and heated at 100° C. for 1 hour. Subsequently, the temperature was slowly increased to 165° C., the generated water and toluene were in an azeotropic state, and water was removed along with toluene from the reaction system. In addition, after they were reacted for 3 days at 165° C., an excess amount of bis-(4-chlorophenyl)sulfone: 6.3 g (22 mmol) was added, and the reaction was performed at the same temperature for 2 days. After the reaction was carried out, the precipitated inorganic salts were filtered. The polymerization solution was reprecipitated in ethanol and dried under vacuum for overnight to obtain Cl terminated PEES (5.4 g). The following Formula (a.2) illustrates synthesis scheme of the Cl terminated PEES.

1.1.3 Synthesis of NH₂ Terminated PEES

To a 100 mL two-neck recovery flask to which the Dean-Stark tube and the three-way cock were connected, Cl terminated PEES: 4.5 g obtained in [1.1.2], an excess amount of 4-hydroxyaniline: 0.16 g (1.5 mmol), and K₂CO₃: 0.95 g (6.9 mmol) were added, and they were dried for 1 hour under vacuum.

Commercial dehydrated DMAc: 20 mL and toluene: 20 mL were added thereto, and heated at 100° C. for 1 hour. Subsequently, the temperature was slowly increased to 165° C., the generated water and toluene were in an azeotropic state, and water was removed along with toluene from the reaction system. In addition, after they were reacted for 3 days at 165° C., the precipitated inorganic salts were filtered. The polymerization solution was reprecipitated in ethanol and dried under vacuum for overnight to obtain NH₂ terminated PEES (3.7 g). The following Formula (a.3) illustrates synthesis scheme of the NH₂ terminated PEES.

[Chemical Formula 10]

(a.2)

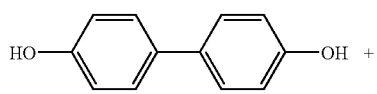

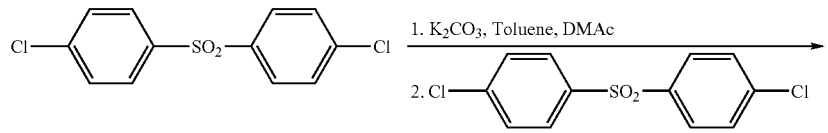

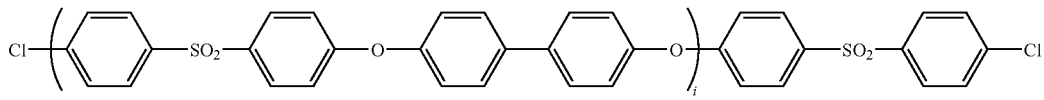

[Chemical Formula 11]

(a.3)

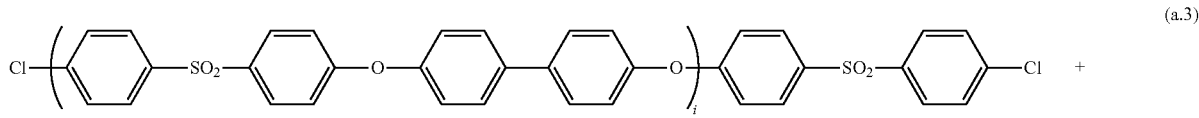

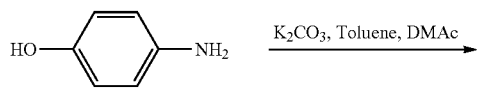

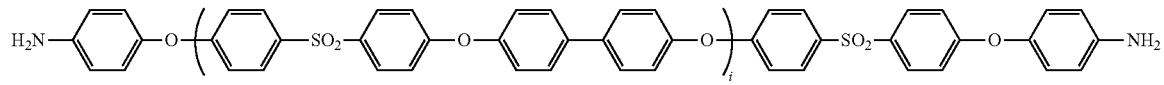

1.2 Synthesis of the Hydrophilic Segment

According to the following process, F-Ph terminated poly(perfluoropropyl sulfoneimide) was synthesized. That is, to a 100 mL flask, perfluoropropyl-1,3-disulfoneamide (C3A): 2.48 g (8 mmol), perfluoropropyl-1,3-disulfonylfluoride (C3F): 2.40 g (7.6 mmol), triethylamine: 6.46 mL, and acetnitrile: 8 mL were added, and heated at 80° C. for 72 hours. An excess amount of C3A: 4.9 g (16 mmol) was added thereto, and reacted at the same temperature for 2 days. After the reaction was carried out, 4-fluorobenzenesulfonylchloride: 6.23 g (32 mmol) was added thereto, and reacted at the same temperature for 2 days.

After that, the solvent was removed by distillation, and the reaction product was dissolved in a NaOH aqueous solution, and subjected to ion exchange using the Nafion (trademark) resin. After it was purified by using the silica gel column (ethyl acetate, methanol), it was dried under vacuum at 80° C. for 2 hours to obtain a desired compound (F-Ph terminated poly(perfluoropropyl sulfoneimide) (j=17)) (yield 72%, 4.2 g). The following Formula (b) illustrates the synthesis scheme thereof.

In addition, by changing the molar ratio of C3A and C3F using the same method as the above synthesis method, F-Ph terminated poly(perfluoropropyl sulfoneimide) (j=8.6), F-Ph terminated poly(perfluoropropyl sulfoneimide) (j=20), F-Ph terminated poly(perfluoropropyl sulfoneimide) (j=22), and F-Ph terminated poly(perfluoropropyl sulfoneimide) (j=30) were obtained.

[Chemical Formula 12]

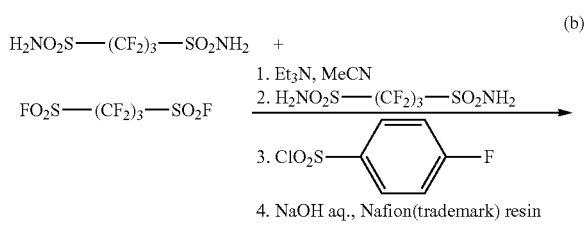

(b)

-continued $$F-\underset{}{\bigcirc}-SO_2NHSO_2-(\!(CF_2)_3-SO_2NHSO_2\!)_{\!j}-\underset{}{\bigcirc}-F$$

1.3 Synthesis of Electrolyte

1.3.1 Electrolyte 1

Example 1

According to the following process, PEES-block-poly(perfluoropropyl sulfoneimide) was synthesized. That is, to a 100 mL two-neck recovery flask to which the Dean-Stark tube and the three-way cock were connected, OH terminated PEES (h=2.2): 0.67 g (0.64 mmol), F-Ph terminated poly(perfluoropropyl sulfoneimide) (j=17): 0.99 g (0.19 mmol), $K_2CO_3$: 0.99 g (7.2 mmol), and 18-crown-6: 0.12 g (0.44 mmol) were added, and they were dried for 1 hour under vacuum.

Commercial dehydrated DMAc: 15 mL and toluene: 20 mL were added thereto, and heated at 100° C. for 1 hour. Subsequently, the temperature was slowly increased to 165° C., the generated water and toluene were in an azeotropic state, and water was removed along with toluene from the reaction system. In addition, after they were reacted for 14 days at 165° C., they were reprecipitated in THF and water and dried under vacuum for overnight to obtain a desired product (0.24 g). The following Formula (c.1) illustrates the synthesis scheme thereof.

[Chemical Formula 13]

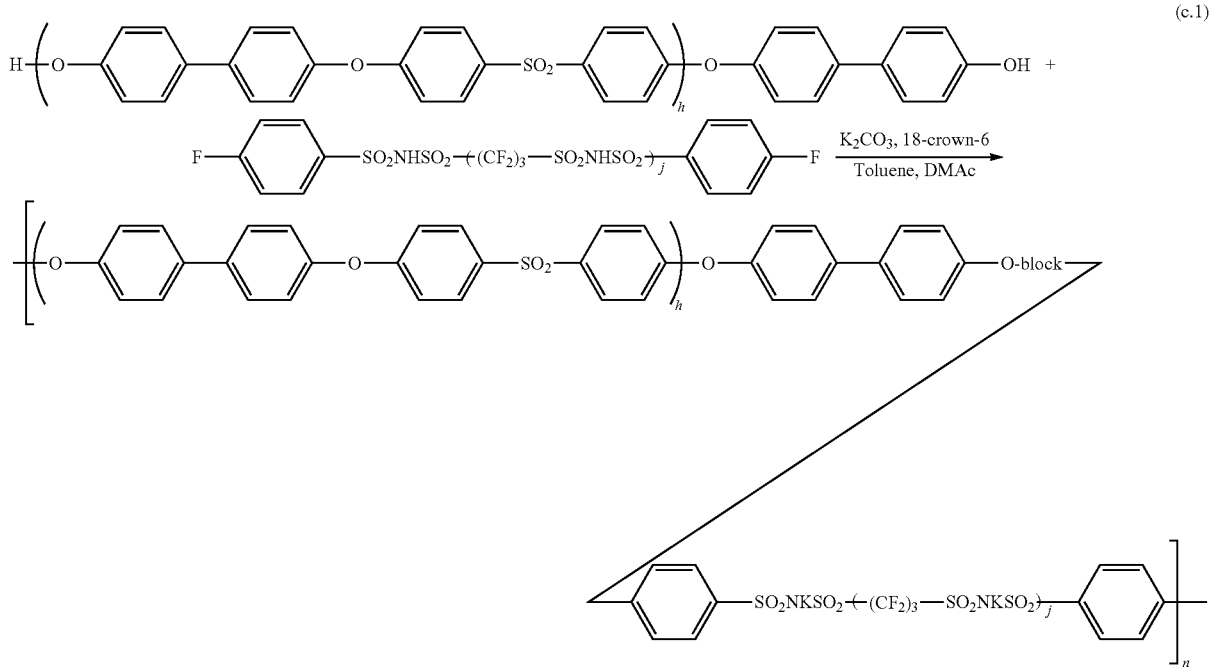

(c.1)

1.3.2 Electrolyte 2

Example 2

According to the following process, PEES-block-poly (perfluoropropyl sulfoneimide) was synthesized. That is, to a 50 mL flask, $NH_2$ terminated PEES: 0.96 g (0.1 mmol), C3A: 2.48 g (8 mmol), C3F: 2.53 g (8 mmol), triethylamine: 8.8 mL, and DMAc/DMSO (2/1): 15 mL were added, and heated at 90° C. for 10 days. After that, the solvent was removed by distillation, and the reaction product was washed with the NaOH aqueous solution, heated in the 3N $H_2SO_4$ aqueous solution at 50° C. for 12 hours, and heated in water at the same temperature for 12 hours. In addition, this was reprecipitated in THF to obtain a desired product (150 mg). The following Formula (c.2) illustrates the synthesis scheme thereof.

1.3.3 Electrolyte 3

Example 3

According to the following process, PEES-block-poly (perfluoropropyl trisulfoneimide) was synthesized. That is, to a 50 mL flask, $NH_2$ terminated PEES: 0.51 g (0.052 mmol), C3A: 1.51 g (4.88 mmol), $ClO_2SNHSO_2Cl$: 1.04 g (4.88 mmol), triethyl amine: 6 mL, and DMAc/DMSO (2/1): 10 mL were added, and heated at 90° C. for 10 days. After that, the solvent was removed by distillation, and the reaction product was washed with the NaOH aqueous solution, heated in the 3N $H_2SO_4$ aqueous solution at 50° C. for 12 hours, and heated in water at 50° C. for 12 hours. This was dried under vacuum for overnight to obtain a desired product (200 mg). The following Formula (c.3) illustrates the synthesis scheme thereof.

[Chemical Formula 14]

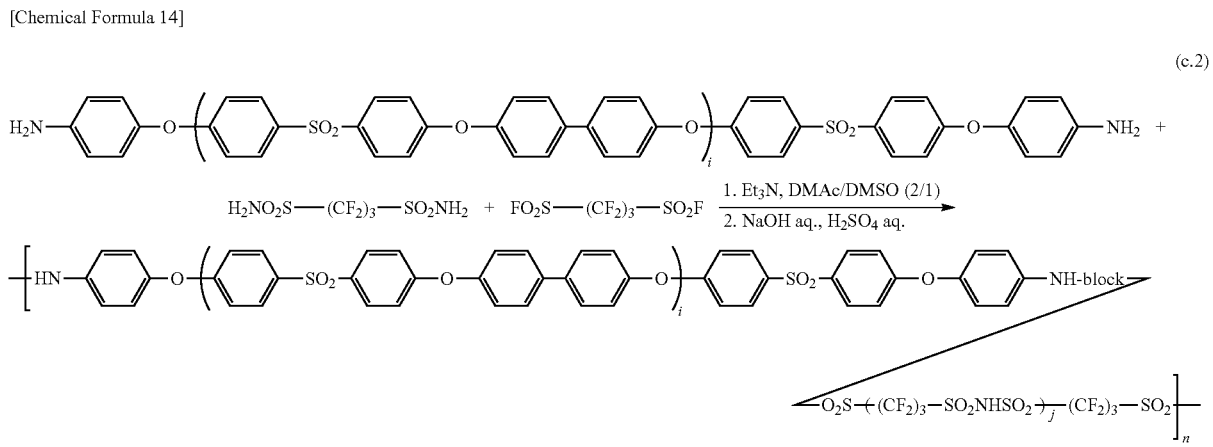

(c.2)

[Chemical Formula 15]

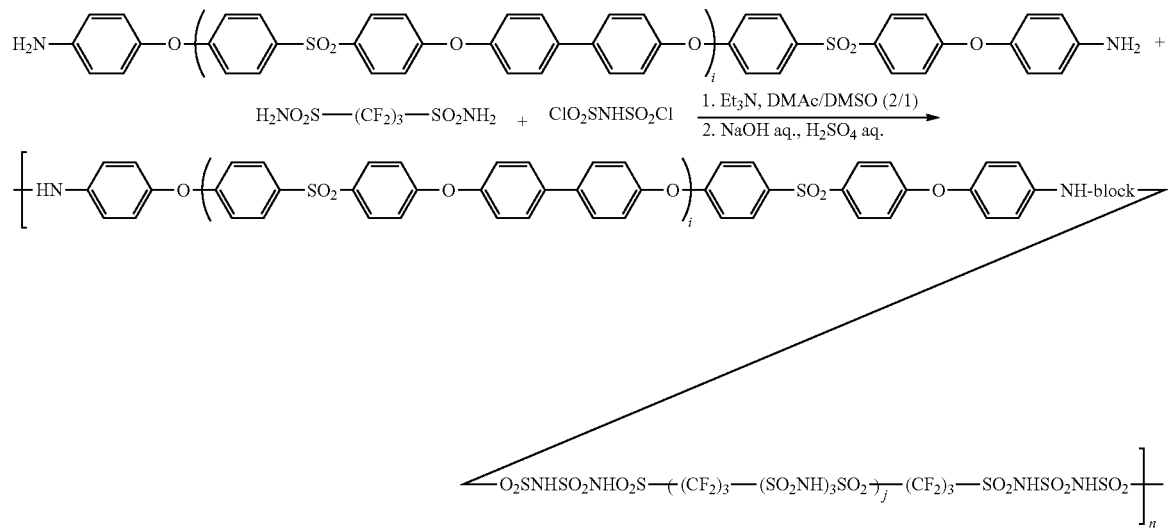

(c,4)

1.3.4 Electrolyte 4

Comparative Example 1

According to the following process, poly(perfluorooctyl sulfolimide) was synthesized. That is, to a 50 mL flask, perfluorooctyl-1,3-disulfoneamide (C8A): 0.31 g (1 mmol), perfluorooctyl-1,3-disulfonylfluoride (C8F): 0.56 g (1 mmol), triethylamine: 0.5 mL, and acetnitrile: 4 mL were added, and heated at 80° C. for 2 hours. After the reaction was performed, the solvent was removed by distillation, and the reaction product was washed with water. Water was removed by distillation from the reaction product, and the residue was dissolved in acetnitrile. To the obtained solution, the Nafion (registered trademark) resin: 22 g was added and the solution was agitated. This operation was repeated twice. After that, the Nafion (registered trademark) resin was filtered from the solution, and the solvent was removed by distillation from filtrate. The residue was dried under vacuum for overnight to obtain a desired product (200 mg). The following Formula (c.4) illustrates the synthesis scheme thereof.

[Chemical Formula 16]

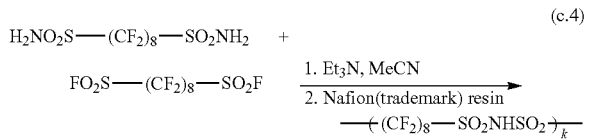

(c.4)

1.3.5 Electrolyte 5

Comparative Example 2

1.3.5.1 Synthesis of F-Ph Terminated mono(perfluoropropyl sulfoneimide)

To a 100 mL flask, C3A: 3.1 g (10 mmol), 4-fluorobenzene sulfonylchloride: 4.2 g (22 mmol), triethylamine: 14 mL (100 mmol), and acetnitrile: 10 mL were added, and heated at 80° C. for 24 hours, and the reaction was carried out. After that, the solvent was removed by distillation, and the reaction product was dissolved in the NaOH aqueous solution, and subjected to ion exchanging using the Nafion resin. They were purified by using the silica gel column (ethyl acetate, methanol), and dried under vacuum at 80° C. for 2 hours to obtain F-Ph terminated mono(perfluoropropyl sulfoneimide) (yield 90%, 5.6 g). The following Formula (c.5) illustrates the synthesis scheme thereof.

[Chemical Formula 17]

$H_2NO_2S\!-\!(CF_2)_3\!-\!SO_2NH_2$ +

F—⟨⟩—SO₂Cl  →(1. Triethylamine / Acetnitrile)  →(2. NaOH aq / 3. Nafion(trademark) resin)

F—⟨⟩—SO₂NHSO₂—((CF₂)₃—SO₂NHSO₂)₁—⟨⟩—F (c.5)

1.3.5.2 Synthesis of Electrolyte 5

To F-Ph terminated mono(perfluoropropyl sulfoneimide): 2.0 g (3.2 mmol), bisphenol: 0.59 g (3.2 mmol), potassium carbonate 2.6 g (12.8 mmol), and 18-crown-6: 1.68 g (6.3 mmol) were added and dried under vacuum for 1 hour. After that, commercial dehydrated DMAc: 13 mL and toluene: 20 mL were added thereto, and dried under vacuum at 100° C. for 1 hour. Subsequently, the temperature was slowly increased to 165° C., the generated water and toluene were in an azeotropic state, and water was removed along with toluene from the reaction system. After they were reacted for 7 days at 165° C., they were reprecipitated in EtOH, washed by using the 3N $H_2SO_4$ aqueous solution at 80° C., and dried under vacuum for 1 hour to obtain a desired product (yield 43%, 0.98 g). The following Formula (c.6) illustrates the synthesis scheme thereof.

[Chemical Formula 18]

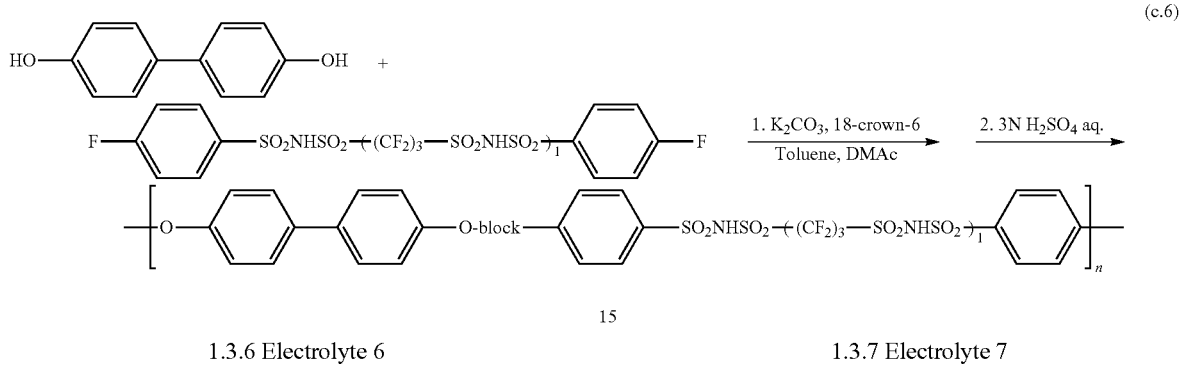

(c.6)

1.3.6 Electrolyte 6

Example 4

Like Example 1, the reaction was performed by using OH terminated PEES (h=4.0): 0.48 g (OH terminated group amount 0.54 mmol), F-Ph terminated poly(perfluoropropyl sulfoneimide) (j=30) that was subjected to K-salification using the KOH aqueous solution: 3 g (F-Ph terminated group amount 0.54 mmol), $K_2CO_3$: 0.15 g (1.1 mmol), 18-crown-6: 0.29 g (1.1 mmol), DMAc: 25 mL, and toluene: 25 mL.

After the reaction was performed, the polymerization solution was filtered. The mother solution was added to THF to be reprecipitated, and reprecipitated in the 1N $HNO_3$ aqueous solution. The precipitate was dissolved in water and dialysis was performed by using a dialysis membrane (molecular weight partition 1000). Next, water was removed by distillation to obtain a desired product (0.38 g, EW351 g/eq.).

Formula (c.7) illustrates the synthesis scheme thereof.

1.3.7 Electrolyte 7

Example 5

Like Example 1, the reaction was performed by using OH terminated PEES (h=12): 0.70 g (OH terminated group amount 0.28 mmol), F-Ph terminated poly(perfluoropropyl sulfoneimide) (j=22) that was subjected to K-salification using the KOH aqueous solution: 1.3 g (F-Ph terminated group amount 0.28 mmol), $K_2CO_3$: 77 mg (0.56 mmol), 18-crown-6: 0.15 g (0.56 mmol), DMAc: 18 mL, and toluene: 20 mL.

In addition, a desired product was obtained by using the same purification method as Example 1 (0.77 g, EW455 g/eq.). Formula (c.7) illustrates the synthesis scheme thereof.

[Chemical Formula 19]

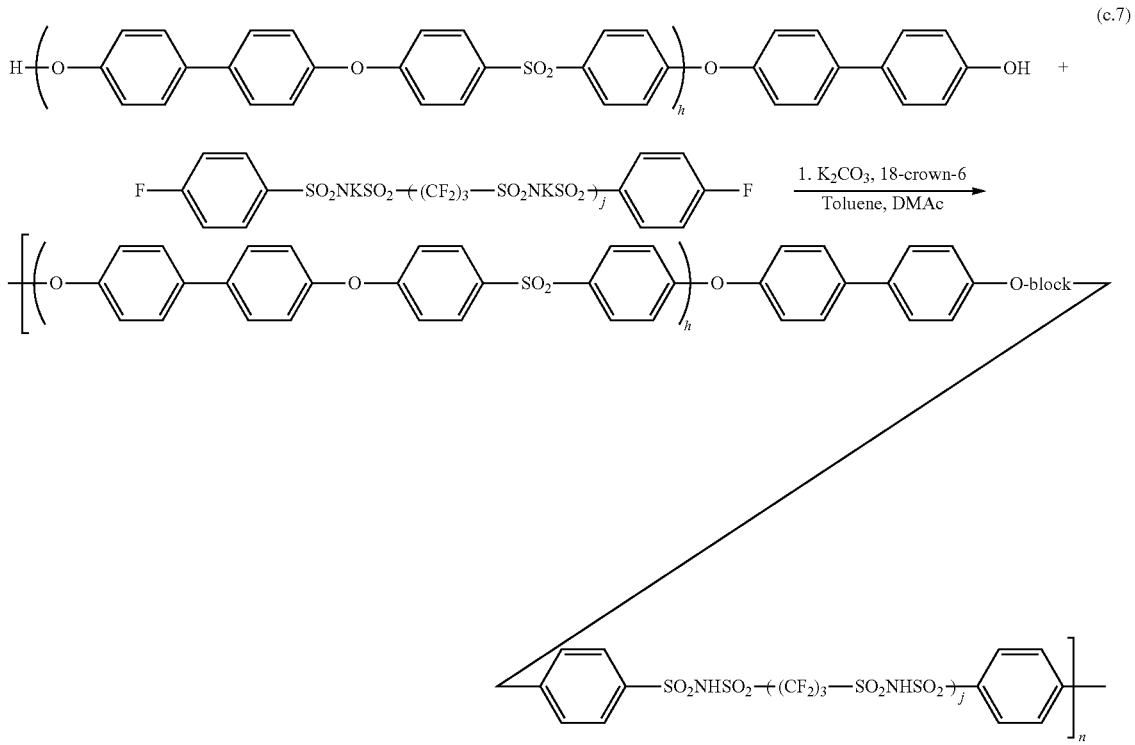

(c.7)

1.3.8 Electrolyte 8

Examples 6-1 to 6-4

1.3.8.1 Example 6-1

Like Example 1, the reaction was performed by using OH terminated PEES (h=6.7): 16 g (OH terminated group amount 11 mmol), F-Ph terminated poly(perfluoropropyl sulfoneimide) (j=8.6) that was subjected to K-salification using the KOH aqueous solution: 18 g (F-Ph terminated group amount 11 mmol), $K_2CO_3$: 3.1 g (22 mmol), 18-crown-6: 5.9 g (22 mmol), DMAc: 300 mL, and toluene: 250 mL.

After the reaction was performed, the polymerization solution was filtered. The mother solution was added to the 1N HCl aqueous solution to be reprecipitated. The recovered precipitate was dissolved in acetnitrile, and filtered. Acetnitrile of the mother solution was removed by distillation to obtain a desired product (Example 6-1: 30 g, EW799 g/eq.). Formula (c.7) illustrates the synthesis scheme thereof.

1.3.8.2 Example 6-2

0.5 g of the electrolyte obtained in Example 6-1 was dissolved in 5 g of acetnitrile, and 1,4-dioxane: 19 g was added thereto. The generated precipitate was filtered, and 1,4-dioxane: 4 g was added to the mother solution. The generated precipitate was recovered to obtain a desired product (Example 6-2: 0.12 g, EW623 g/eq.).

1.3.8.3 Example 6-3

0.5 g of the electrolyte obtained in Example 6-1 was dissolved in 5 g of acetnitrile, and 1,4-dioxane: 25 g was added thereto. The generated precipitate was recovered to obtain a desired product (Example 6-3: 0.32 g, EW598 g/eq.).

1.3.8.4 Example 6-4

0.5 g of the electrolyte obtained in Example 6-1 was dissolved in 5 g of acetnitrile, and chloroform: 45 g was added thereto. The generated precipitate was recovered to obtain a desired product (Example 6-4: 0.17 g, EW512 g/eq.).

1.3.9 Electrolyte 9

Examples 7-1 to 7-3

1.3.9.1 Example 7-1

Like Example 1, the reaction was performed by using OH terminated PEES (h=15): 15 g (OH terminated group amount 5.1 mmol), F-Ph terminated poly(perfluoropropyl sulfoneimide) (j=20) that was subjected to K-salification using the KOH aqueous solution: 19 g (F-Ph terminated group amount 5.1 mmol), $K_2CO_3$: 1.4 g (10 mmol), 18-crown-6: 2.7 g (10 mmol), DMAc: 300 mL, and toluene: 250 mL.

After the reaction was performed, the polymerization solution was filtered. The mother solution was added to the 1N HCl aqueous solution to be reprecipitated. The recovered precipitate was dissolved in acetnitrile, and filtered. Acetnitrile of the mother solution was removed by distillation to obtain a desired product (Example 7-1: 34 g, EW661 g/eq.). Formula (c.7) illustrates the synthesis scheme thereof.

1.3.9.2 Example 7-2

0.5 g of the electrolyte obtained in Example 7-1 was dissolved in 5 g of acetnitrile, and 1,4-dioxane: 20 g was added thereto. The generated precipitate was recovered to obtain a desired product (Example 7-2: 0.20 g, EW558 g/eq.).

1.3.9.3 Example 7-3

0.5 g of the electrolyte obtained in Example 7-1 was dissolved in 5 g of acetnitrile, and 1,4-dioxane: 25 g was added thereto. The generated precipitate was recovered to obtain a desired product (Example 7-3: 0.31 g, EW428 g/eq.).

1.3.10 Electrolyte 10

Example 8

Synthesis was performed by using the same method as that described in [1.2 Synthesis of Hydrophilic Segment] except that $ClO_2S$-Ph-Br was used instead of $ClO_2S$-Ph-F. Br-Ph terminated poly (perfluoropropyl sulfoneimide) (q=5) that was subjected to Na-salification using the NaOH aqueous solution: 0.534 g (0.64 mmol), biphenyl diboronic acid: 0.273 g (1.12 mmol), dibromo phenyl: 0.113 g (0.48 mmol), $Pd(PPh_3)_4$: 0.018 g, and $K_2CO_3$: 0.490 g were mixed with each other in the Schlenk tube. Methyl cellosolve: 2 mL and water: 1 mL were added thereto and heated at 80° C. for 1 day.

After that, the solvent was removed by distillation, and a hydrochloric acid was added thereto. The reaction product was washed with water by using a centrifugal device until water is neutral to obtain a desired product (0.181 g, EW390 g/eq.). p was 6.5, which was obtained by NMR spectrum. The following Formula (c.8) illustrates the synthesis thereof.

[Chemical Formula 20]

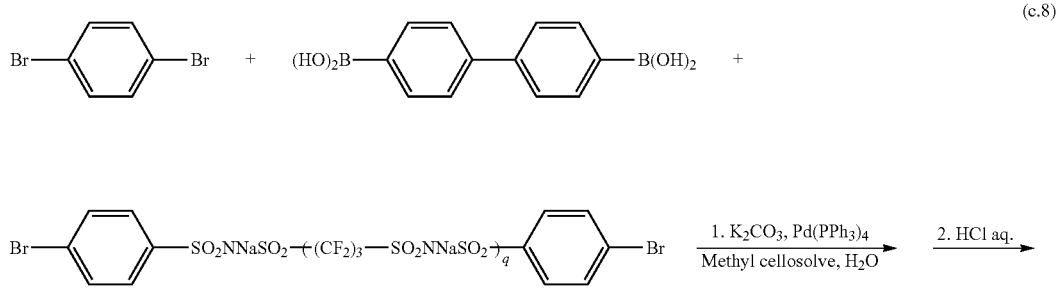

(c.8)

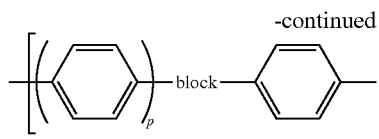

1.3.11 Electrolyte 11

Example 9

Synthesis was performed by using the same method as that described in [1.2 Synthesis of Hydrophilic Segment] except that $ClO_2S$-Ph-Br was used instead of $ClO_2S$-Ph-F. Br-Ph terminated poly (perfluoropropyl sulfoneimide) (q=31) that was subjected to Na salification using the NaOH aqueous solution: 0.586 g (0.06 mmol), phenyl diboronic acid: 0.0984 g (0.57 mmol), dibromo phenyl: 0.121 g (0.51 mmol), $Pd(PPh_3)_4$: 0.008 g, and $K_2CO_3$: 0.127 g were mixed with each other in the Schlenk tube. Methyl cellosolve: 4 mL and water: 2 mL were added thereto and heated at 80° C. for 2 day.

After that, the solvent was removed by distillation, and a hydrochloric acid was added thereto. The reaction product was washed with water by using a centrifugal device until water is neutral to obtain a desired product (0.160 g, EW344 g/eq.). p was 12.3, which was obtained by NMR spectrum. The following Formula (c.9) illustrates the synthesis scheme thereof.

[Chemical Formula 21]

(c.9)

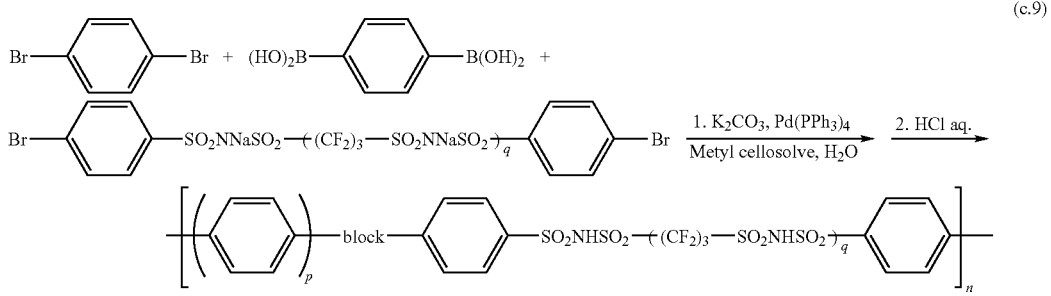

1.4 Manufacturing of the Electrolyte Membrane

The electrolytes 1 to 3, 5, and 7 that were obtained in Examples 1 to 3, Example 5 and Comparative Example 2 were dissolved in DMAc, and cast on a polytetrafluoroethylene petri dish to vaporize the solvent at 80° C. to manufacture the membrane. Next, annealing was performed at 100° C., and washing with 1N $H_2SO_4$ aqueous solution, water rinsing, and drying were performed to manufacture the electrolyte membrane.

In addition, in respects to the electrolyte 7 that was obtained in Example 5, another type of electrolyte membrane was manufactured by using the same method, mentioned above, except that p-cresol/NMP (=1/1=vol/vol), o-dichlorobenzene/DMSO (=1/1=vol/vol) or p-cresol/DMAc (=1/1=vol/vol) was used as the solvent instead of DMAc.

In addition, the electrolytes 8 and 9 that were obtained in Examples 6-1 to 6-4 and Examples 7-1 to 7-3 were dissolved in p-cresol/NMP (=1/1=vol/vol), and the electrolyte membrane was manufactured by using the same method mentioned above.

In addition, the electrolyte 4 that was obtained in Comparative Example 1 was dissolved in acetnitrile, and the solvent was vaporized at room temperature to manufacture the membrane. The next operation was performed by using the same method mentioned above.

1.5 Complex Membrane 1

Example 10

The DMAc solution (16 wt %) of the electrolyte 7 that was obtained in Example 5 was incorporated in the polyethylene porous material (porosity 85%) under vacuum. After that, vacuum drying was performed at 60° C. for overnight, and washing with the 1N HCl aqueous solution, water rinsing, and drying was performed to obtain a complex membrane 1.

2. Test Method

2.1 Hot Water Resistance Test

The obtained electrolyte membrane was immersed in hot water at 80° C. to examine the solubility. When it was immersed in hot water at 80° C. for 24 hours, if a reduction in weight is 5% or less, the membrane was evaluated as "O", and if a reduction in weight is more than 5%, the membrane was evaluated as "x".

2.2 Fenton's Test 30 mL of the 3% hydrogen peroxide solution to which $FeSO_4$ was added so that 10 ppm of $Fe^{2+}$ was present in the solution and 20 mg of the electrolyte membrane were put into the autoclave and heated at 100° C. for 24 hours. Next, leaching amount of the fluorine ion in the solution was measured by using the F electrode.

2.3 Measurement of the Conductivity

The obtained electrolyte membrane was assembled with the conductivity measuring cell, and resistance in a planar direction was measured by the LCR meter (manufactured by HIOKI E.E. Corporation) at a predetermined humidity. By reducing this value, the conductivity value was obtained.

2.4 Measurement of IR Spectrum

IR spectra of the intermediate product and the electrolyte were measured.

2.5 Physical Properties of the Membrane

The water content and the dimensional change ratio in hydrous state of the obtained electrolyte membrane were measured.

2.6 Measurement of NMR Spectrum

At room temperature, in deuterated DMSO, the $^1$H-NMR spectrum and the $^{19}$F-NMR spectrum of the electrolyte were measured.

2.7 Evaluation of the Electrolyte in the Catalyst Layer

The mixed solvent of water and alcohol was added to the electrolyte 6 that was obtained in Example 4 or the electrolyte 10 that was obtained in Example 8 and platinum-carrying carbon (Pt/C=0.55 (wt/wt), electrolyte/C=0.75 (wt/wt)), and agitated by using a homogenizer to manufacture catalyst ink. This ink was coated on the Nafion (registered trademark) 211 membrane by using a spray. By performing hot pressing at 120° C. for 5 min, MEA was manufactured. Carbon cloth was used as a current collector, and MEA laminated with the current collectors was built into a fuel unit cell evaluation apparatus (cell size: 13 cm$^2$).

By using Hydrogen gas as fuel and air as an oxidizing agent, the unit cell characteristic test was performed under the condition of cell temperature of 80° C., anode and cathode relative humidity of 60%, and rear pressure of 0.4 MPa.

3. Result

3.1 IR Spectrum

Figure 2:
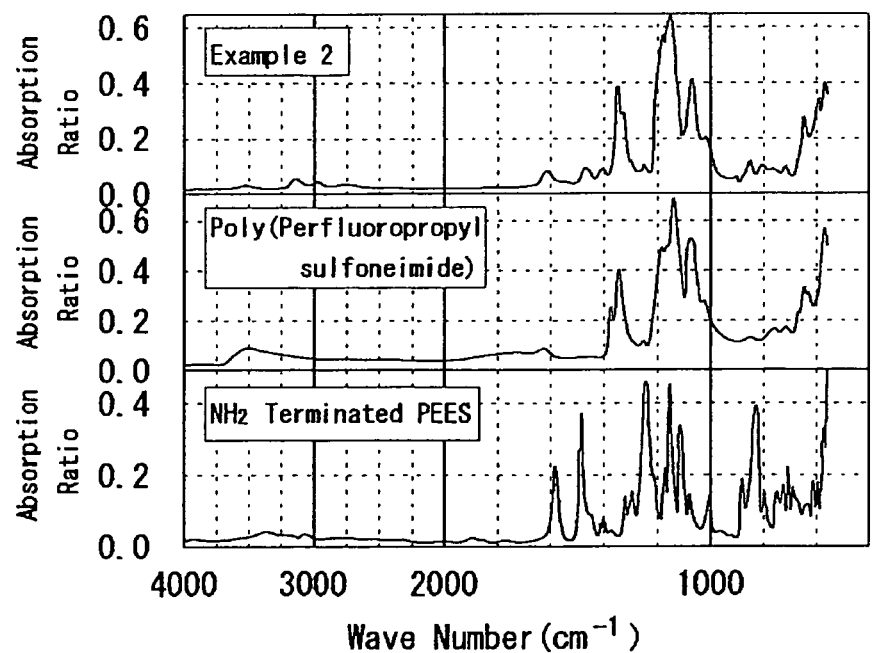
FIG. 2 illustrates IR spectra of $NH_2$ terminated PEES, poly(perfluoropropyl sulfoneimide) and an electrolyte 2 obtained in Example 2.
Figure 3:
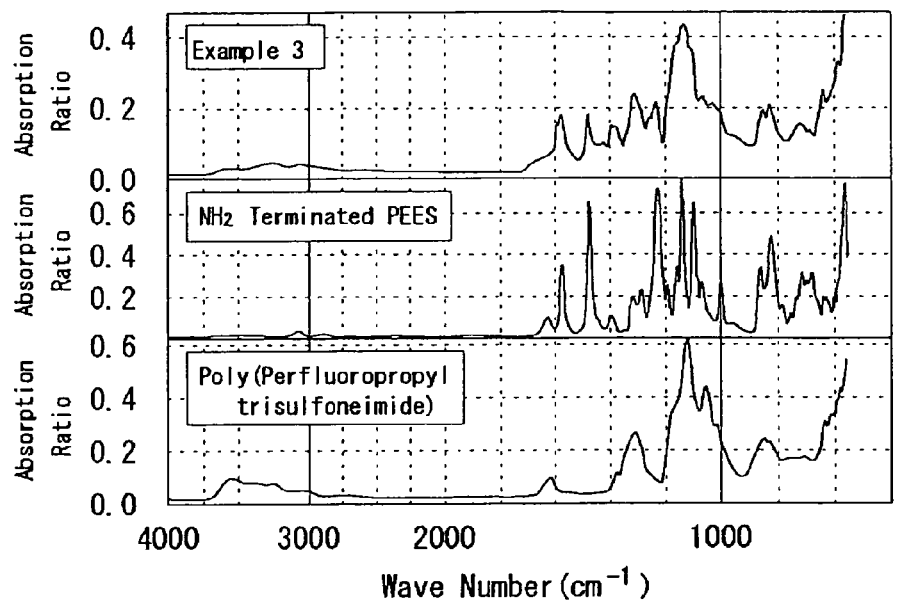
FIG. 3 illustrates IR spectra of poly(perfluoropropyl trisulfoneimide), $NH_2$ terminated PEES, and an electrolyte 3 obtained in Example 3.
Figure 4:
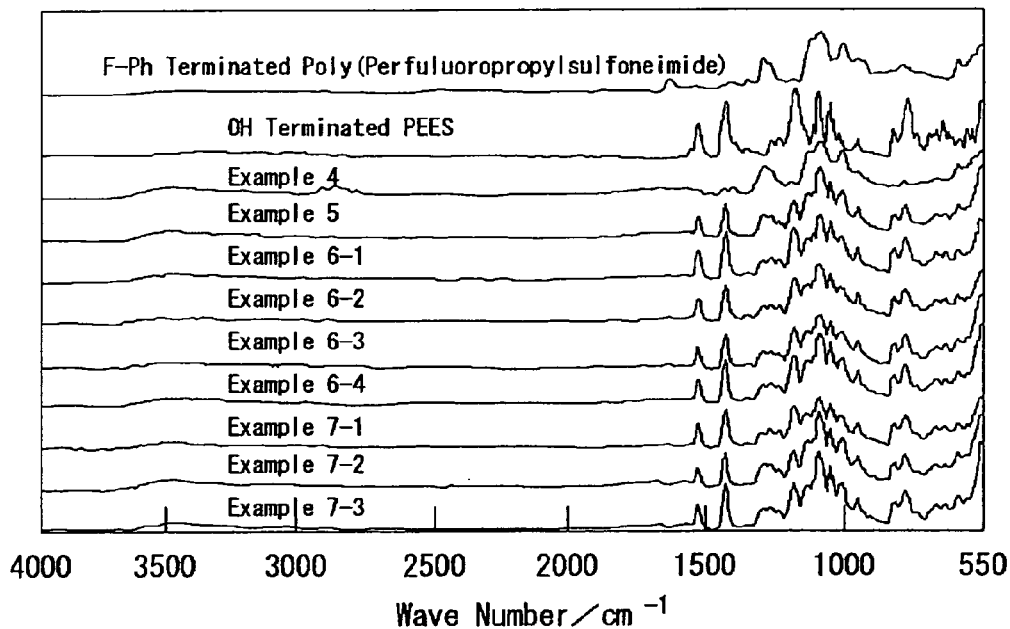
FIG. 4 illustrates IR spectra of F-Ph terminated poly(perfluoropropyl sulfoneimide), OH terminated PEES and electrolytes 6 to 9 obtained in Examples 4 to 7.

FIGS. 1 to 3 illustrate IR spectra of the electrolytes 1 to 3 obtained in Examples 1 to 3. In addition, FIG. 4 illustrates IR spectra of the electrolytes 6 to 9 obtained in Examples 4 to 7. Through FIGS. 1 to 4, it can be seen that desired products were obtained.

3.2 NMR Spectrum

Figure 5:
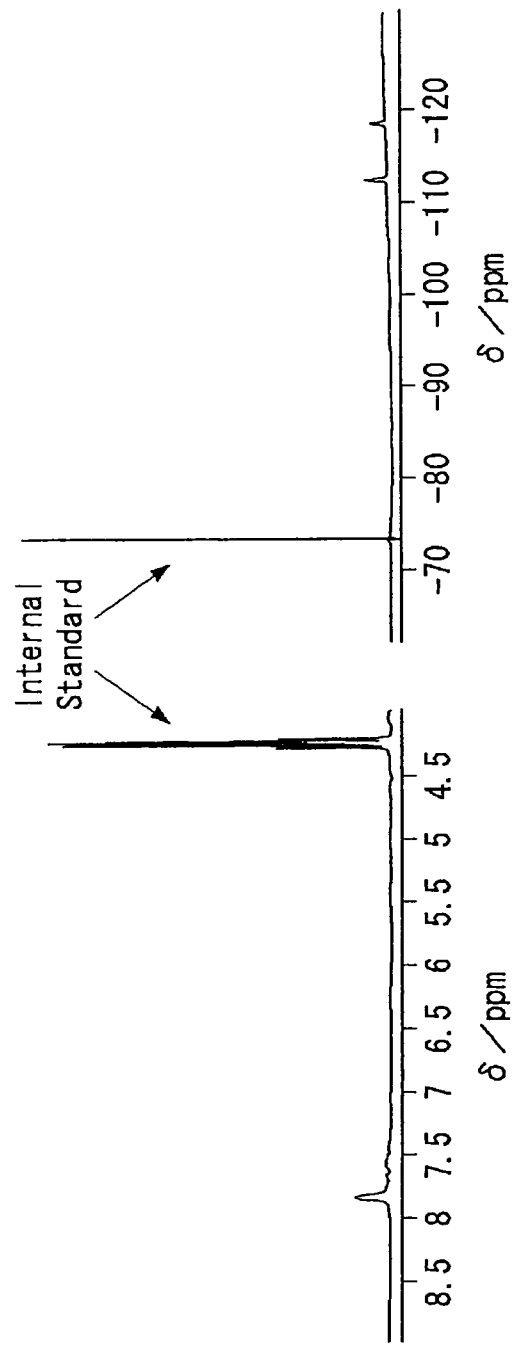
FIG. 5 illustrates an NMR spectrum of an electrolyte 10 obtained in Example 8.
Figure 6:
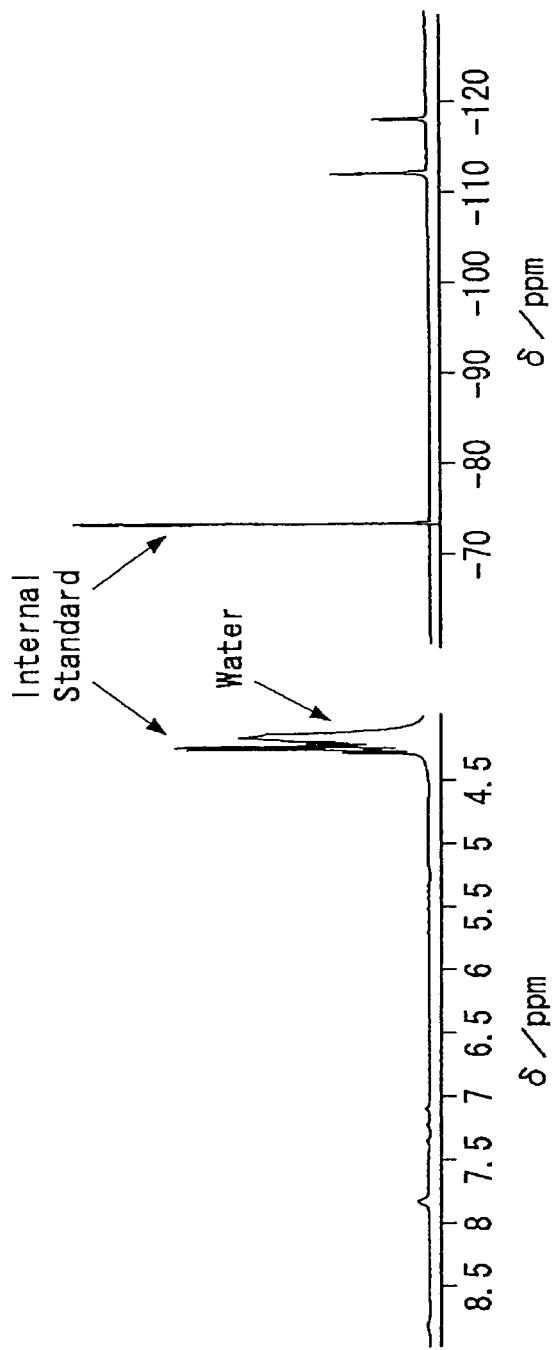
FIG. 6 illustrates an NMR spectrum of an electrolyte 11 obtained in Example 9.

FIGS. 5 and 6 illustrate NMR spectra of the electrolytes 10 to 11 obtained in Examples 8 to 9. By using (CF$_3$CH$_2$)$_2$O as an internal standard, desired products were identified. Through FIGS. 5 to 6, it can be seen that desired products were obtained.

3.3 Fenton's Test

The leaching amount of F ion from the Nafion (registered trademark) 112 that was measured under the same condition was 14.8 ppm. On the other hand, the leaching amount of F ion from the electrolyte 4 obtained in Comparative Example 1 was 0.3 ppm. The leaching amount of F ion from the electrolyte 4 was about 1/50 of the Nafion (trademark) 112, and it had the high chemical stability. Accordingly, since the hydrophilic segments of the electrolytes 1 to 3 had the same structure as that of the electrolyte 4, in practice, it is deemed that the chemical durabilities of the electrolytes 1 to 3 are high.

In addition, it is deemed that the degradation of the electrolyte membrane is caused by hydroxy radical that is present in water cluster of the hydrophilic segment. Therefore, there is no meaning of the Fenton's test to the electrolytes 1 to 3, because the hydrophobic segment and hydroxy radical are forcibly contacted to each other in the test, and the degradation of the hydrophobic segment occurs inevitably.

3.4 Hot Water Resistance Test

Table 1 shows results of the hot water resistance test. Both the electrolyte 4 (Comparative Example 1) and the electrolyte 5 (Comparative Example 2) were dissolved in hot water. Meanwhile, the electrolyte 6 with low EW obtained in Example 4 was dissolved in hot water, but the electrolytes 1 to 3, and 7 to 9 that were obtained in Examples 1 to 3, and 5 to 7 were not dissolved in hot water. Through Table 1, it can be seen that the electrolytes 1 to 3, and 7 to 9 are capable of being sufficiently used as the electrolyte membrane for fuel cell operated at a temperature of around 80° C.

TABLE 1

| Hot water resistance test | | | | |
|---|---|---|---|---|
| Comparative Example 1 | Comparative Example 2 | Example 1 | Example 2 | Example 3 |
| X | X | ○ | ○ | ○ |
| Example 4 | Example 5 | Example 6 | Example 7 | |
| X | ○ | ○ | ○ | |

3.5 Physical Properties of the Membrane

The conductivity of the electrolyte membrane 1 obtained in Example 1 at room temperature in water was 0.03 S/cm. In addition, EW was 705 g/eq., the water content was 64%, and the dimensional change ratio was 22% (planar direction) and 32% (thickness direction).

Table 2 shows EW, conductivity at room temperature and relative humidity of 80%, water content, the dry-wet dimensional change ratio in a planar direction, and the dry-wet dimensional change ratio in a thickness direction of the electrolyte membranes 1, and 7 to 9 obtained in Examples 1, and 5 to 7.

The conductivities of Examples 5, 6-3, 6-4, and 7-1 to 7-3 are higher than that of Nafion (trademark) 112. In addition, in Example 5, by changing the cast solvent, the water content is capable of being controlled. In particular, the effect was significant in the mixed solvent system of p-cresol/NMP.

TABLE 2

| Example | Cast Solvent | EW (g/eq.) | Conductivity (×10⁻² S/cm) | Water Content (%) | Dry-wet dimentional change ratio (%) Planar direction | Dry-wet dimentional change ratio (%) Thickness direction |
|---|---|---|---|---|---|---|
| 1 | DMAc | 705 | 1.9 | 64 | 22 | 32 |
| 5 | DMAc | 465 | 10.0 | 4638 | 300 | — |
|  | o-DCB/DMSO |  | 11.0 | 2048 | — | — |
|  | p-cresol/NMP |  | 7.9 | 1228 | 187 | — |
|  | p-cresol/DMAc | — | — | — | — | — |
| 6-1 | p-cresol/NMP | 799 | 3.4 | 57 | 27 | 11 |
| 6-2 | p-cresol/NMP | 623 | 2.4 | 103 | 38 | 74 |
| 6-3 | p-cresol/NMP | 598 | 5.8 | 141 | 25 | 35 |
| 6-4 | p-cresol/NMP | 512 | 4.7 | 113 | 44 | 34 |
| 7-1 | p-cresol/NMP | 661 | 4.2 | 144 | 37 | 15 |
| 7-2 | p-cresol/NMP | 558 | 5.2 | 153 | 36 | 25 |
| 7-3 | p-cresol/NMP | 428 | 6.0 | 144 | 72 | 34 |
| Nafion™ 112 | — | 1094 | 3.8 | 22 | 14 | 13 |

\* o-OCB: o-dichlorobenzen, —: No measurement by cracking of the membrane
Boiling point of the solvent: DMAc 165° C., o-DCB 180° C., DMSO 189° C., p-cresol 202° C., NMP 202° C.

3.6 Physical Properties of the Complex Membrane

Table 3 shows EW, conductivity at room temperature and relative humidity of 80%, water content, the dry-wet dimensional change ratio in a planar direction, and the dry-wet dimensional change ratio in a thickness direction of the electrolyte 7 obtained in Example 5 and the complex membrane 1 obtained in Example 10. By complicating the electrolyte and the porous material of polyethylene, the conductivity is reduced by 1 order, but the hydration swelling is suppressed.

TABLE 3

| Example | Type of membrane | EW (g/eq.) | Conductivity (×10⁻² S/cm) | Water content (%) | Dry-wet dimentional change ratio (%) Planar direction | Dry-wet dimentional change ratio (%) Thickness direction |
|---|---|---|---|---|---|---|
| 5 | Self-standing | 455 | 10.0 | 4638 | 300 | — |
| 10 | Comlex | 973 | 1.1 | 953 | 2.5 | 549 |

Figure 7:
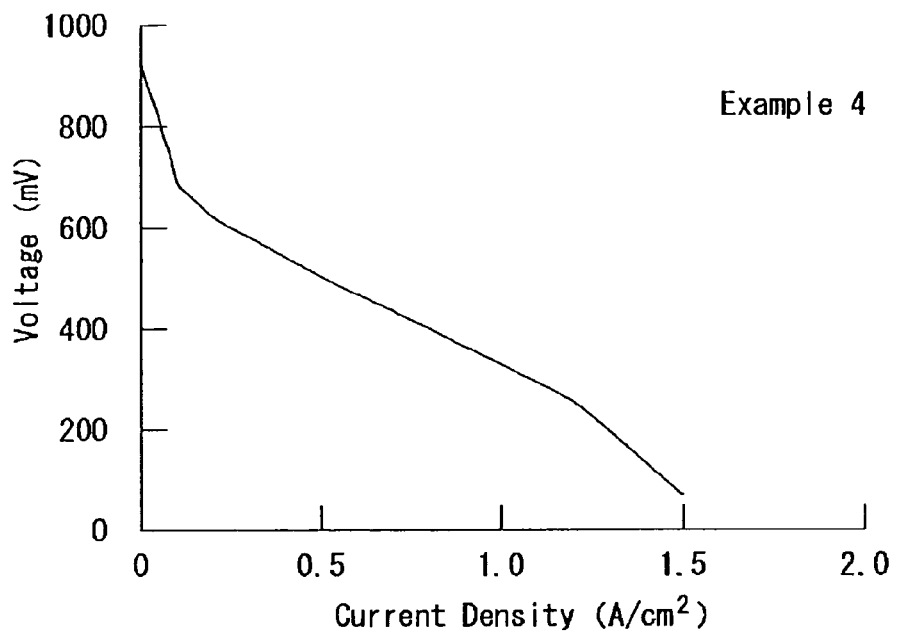
FIG. 7 illustrates an I-V characteristic of a fuel cell in which an electrolyte 6 obtained in Example 4 is used in an electrolyte in a catalyst layer.
Figure 8:
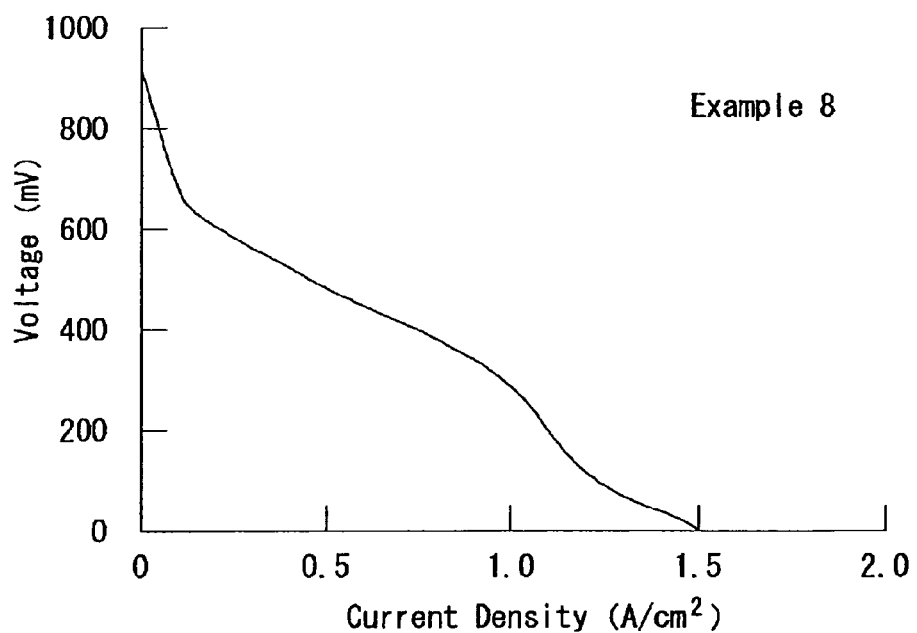
FIG. 8 illustrates an I-V characteristic of a fuel cell in which an electrolyte 10 obtained in Example 8 is used in an electrolyte in a catalyst layer.

\*—: No measurement by cracking of the membrane 3.7 Properties of the Electrolyte in the Catalyst Layer FIGS. 7 and 8 shows results when power generation test is performed using the electrolytes 6 and 10 obtained in Examples 4 and 8 as an electrolyte in a catalyst layer. Output voltage of the unit cell was confirmed, and it was confirmed that power was generated at 0.1 to 1.5 A/cm².

As described above, Examples of the present invention have been described in detail, and the scope of the present invention is not limited to the above Examples but many modifications are possible within the range not departing from the scope of the present invention.

The electrolyte according to the present invention and the production process therefor may be applied to an electrolyte membrane, and an electrolyte in a catalyst layer, which are used electrochemical devices such as a solid polymer fuel cell, a water electrolysis device, a halogenated hydrogen acid electrolysis device, a brine electrolysis device, an oxygen and/or hydrogen concentrating device, a humidity sensor, and a gas sensor, and a production process therefor.

What is claimed is:

1. An electrolyte having a structure where a fluorinated hydrophilic segment A represented by Formula (1) and a hydrocarbon hydrophobic segment B are alternately bonded to each other through chemical bond:

$$A: -E_2-[Rf-E_1]_m- \quad (1)$$

wherein Rf is a linear or a branched perfluoro chain having one or more carbon atoms, $E_1$, and $E_2$ are each a proton conductive portion represented by Formula $—(CONM)_{i1}(CO)_{i2}(SO_2NM)_{i3}(SO_2)_{i4}—$ ($0 \leq i_1$, $0 \leq i_2 \leq 1$, $0 \leq i_3$, $0 \leq i_4 \leq 1$, $0 < i_1 + i_3$, $i_1$ to $i_4$ are each an integer, and M is proton, alkali metal (Li, Na, K, Rb, Cs, and Fr), or alkali earth metal (Be, Mg, Ca, Sr, Ba, and Ra)), $2 \leq m$ (m is an integer), and Rf, $E_1$, and $E_2$ may be each arbitrarily selected in the repeating unit.

2. The electrolyte according to claim 1, wherein the hydrophilic segment A includes a structure represented by Formula (1.2):

$$A: —(SO_2)_{i5}(NMSO_2)_{i6}—[Rf—(SO_2NM)_{i3}(SO_2)_{i4}]_m— \quad (1.2)$$

wherein $1 \leq i_3$, $i_4 = 0$ or 1, $i_5 = 0$ or 1, $1 \leq i_6$, and $2 \leq m$, Rf is a linear or a branched perfluoro chain having one or more carbon atoms and may be arbitrarily selected in the repeating unit, and M is proton, alkali metal (Li, Na, K, Rb, Cs, and Fr), or alkali earth metal (Be, Mg, Ca, Sr, Ba, and Ra)).

3. The electrolyte according to claim 1, wherein the hydrophobic segment B has a structure represented by Formula (2):

$$B: —(Ar_1—Y)_n—Ar_2— \quad (2)$$

wherein $Ar_1$ and $Ar_2$ are each an allylene group,

Y is a direct bond, —O—, —S—, —$SO_2$— or —CO—, $0 \leq n$ (n is an integer), and $Ar_1$ and $Ar_2$, and Y may be each arbitrarily selected in the repeating unit.

4. The electrolyte according to claim 1, wherein the hydrophobic segment B includes aliphatics on a main chain.

5. The electrolyte according to claim 4, wherein the aliphatics include one or more selected from vinyl polymer, polysulfoneamid, polysulfoneimide, polyamide, polyimide, polyether, polyurethane, polyurea, polyester and polycarbonate.

6. The electrolyte according to claim 1, wherein the hydrophobic segment B includes an aromatic ring on a main chain.

7. The electrolyte according to claim 6, wherein the hydrophobic segment B includes a structure in which the aromatic rings are bonded to each other through one or more selected from a sulfoneamide group, a sulfoneimide group, an amide group, an imide group, an ether group, a urethane group, a urea group, an ester group and a carbonate group.

8. The electrolyte according to claim 3, wherein $Ar_1$ and $Ar_2$ are each an allylen group having any one of an alkyl group, an alkoxy group, an ally group or an allyloxy group as a side chain.

9. The electrolyte according to claim 1, wherein the electrolyte is a block copolymer that includes the hydrophilic segment A and the hydrophobic segment B.

10. The electrolyte according to claim 9, wherein the block copolymer is a diblock copolymer.

11. The electrolyte according to claim 9, wherein the block copolymer is a triblock copolymer.

12. The electrolyte according to claim 9, wherein the block copolymer is a multiblock copolymer.

13. An electrolyte membrane using the electrolyte according to claim 1.

14. An electrolyte membrane comprising:
a complex of the electrolyte according to claim 1 and a porous material.

15. A fuel cell using the electrolyte according to claim 1.

16. A catalyst layer wherein the electrolyte according to claim 1 is used in an electrolyte in the catalyst layer.

17. A fuel cell comprising:
an electrolyte membrane that includes a complex of the electrolyte according to claim 1, and a porous material.

18. A process for producing an electrolyte membrane, the process comprising:
a step of dissolving the electrolyte according to claim 1 in a solvent and forming a membrane by casting obtained solution of the electrolyte.

19. The process for producing an electrolyte membrane according to claim 18, wherein the solvent is a mixed solvent that includes at least a solvent A and a solvent B.

20. The process for producing an electrolyte membrane according to claim 19, wherein the mixed solvent is (1) a mixture that includes the solvent A that is capable of dissolving both the hydrophilic portion and the hydrophobic portion of the electrolyte and the solvent B that is capable of dissolving only the hydrophobic portion of the electrolyte, or (2) a mixture that includes the solvent A that is capable of dissolving both the hydrophilic portion and the hydrophobic portion of the electrolyte and the solvent B that is not capable of dissolving any of the hydrophobic portion and the hydrophilic portion of the electrolyte.

21. The process for producing an electrolyte membrane according to claim 19, wherein a boiling point difference between the solvent A and the solvent B is less than 37° C.

22. The process for producing an electrolyte membrane according to claim 19, wherein the mixed solvent is a mixture of p-cresol and NMP or a mixture of o-dichlorobenzene and DMSO.

23. A process for producing an electrolyte, the process comprising:

a reaction step of reacting one or more polymer A in which functional groups are bonded to both ends of a fluorinated hydrophilic segment A represented by Formula (1), or one or more monomer A or polymer A that is capable of forming the hydrophilic segment A, and one or more polymer B in which functional groups are bonded to both ends of a hydrocarbon hydrophobic segment B, or one or more monomer B or polymer B that is capable of forming the hydrophobic segment B:

$$A: -E_2-[Rf-E_1]_m- \qquad (1)$$

wherein Rf is a linear or a branched perfluoro chain having one or more carbon atoms, $E_1$, and $E_2$ are each a proton conductive portion represented by Formula —$(CONM)_{i1}(CO)_{i2}(SO_2NM)_{i3}(SO_2)_{i4}$— ($0 \leq i_1, 0 \leq i_2 \leq 1, 0 \leq i_3, 0 \leq i_4 \leq 1, 0 < i_1+i_3$, $i_1$ to $i_4$ are each an integer, and M is proton, alkali metal (Li, Na, K, Rb, Cs, and Fr), or alkali earth metal (Be, Mg, Ca, Sr, Ba, and Ra)), $2 \leq m$, and Rf, $E_1$, and $E_2$ may be each arbitrarily selected in the repeating unit.

24. The process for producing an electrolyte according to claim 23, wherein the polymer A is represented by Formula (3.1):

$$T_1-Ar_3-E_2-[Rf-E_1]_m-Ar_4-T_2 \qquad (3.1)$$

wherein Rf is a linear or a branched perfluoro chain having one or more carbon atoms, $E_1$, and $E_2$ are each a proton conductive portion represented by Formula —$(CONM)_{i1}(CO)_{i2}(SO_2NM)_{i3}(SO_2)_{i4}$— ($0 \leq i_1, 0 \leq i_2 \leq 1, 0 \leq i_3, 0 \leq i_4 \leq 1, 0 < i_1+i_3$, $i_1$ to $i_4$ are each an integer, and M is proton, alkali metal (Li, Na, K, Rb, Cs, and Fr), or alkali earth metal (Be, Mg, Ca, Sr, Ba, and Ra)), $2 \leq m$, $T_1$ and $T_2$ are each F, Cl, Br, I, OH, SH, —$B(OH)_2$ or cyclic boronic ester, $Ar_3$ and $Ar_4$ are each an allylen group, and Rf, and $E_1$ may be each arbitrarily selected in the repeating unit.

25. The process for producing an electrolyte according to claim 23, wherein the monomer A or the polymer A is represented by Formula (3.2):

$$T_3-[Rf-E_1]_{m'}-Rf'-T_4 \qquad (3.2)$$

wherein Rf is a linear or a branched perfluoro chain having one or more carbon atoms, $E_1$ is a proton conductive portion represented by Formula —$(CONM)_{i1}(CO)_{i2}(SO_2NM)_{i3}(SO_2)_{i4}$— ($0 \leq i_1, 0 \leq i_2 \leq 1, 0 \leq i_3, 0 \leq i_4 \leq 1, 0 < i_1+i_3$, $i_1$ to $i_4$ are each an integer, and M is proton, alkali metal (Li, Na, K, Rb, Cs, and Fr), or alkali earth metal (Be, Mg, Ca, Sr, Ba, and Ra)), $0 \leq m'$, Rf' is a linear or a branched perfluoro chain having one or more carbon atoms, $T_3$ and $T_4$ are each —$NZ_1Z_2$, —$SO_2NZ_1Z_2$, —$SO_2X$, —$CONZ_1Z_2$ or —COX ($Z_1$ and $Z_2$ are each H, M, $SiMe_3$, M is alkali metal (Li, Na, K, Rb, Cs, and Fr) or alkali earth metal (Be, Mg, Ca, Sr, Ba, and Ra), and X is halogen or OH), and Rf, and $E_1$ may be each arbitrarily selected in the repeating unit.

26. The process for producing an electrolyte according to claim 23, wherein the monomer B or the polymer B is represented by Formula (4.1):

$$S_1-(Ar_1-Y)_n-Ar_2-S_2 \qquad (4.1)$$

wherein $Ar_1$ and $Ar_2$ are each an allylen group,

Y is a direct bond, —O—, —S—, —$SO_2$— or —CO—, $0 \leqq n$ (n is an integer), $S_1$ and $S_2$ are each —OH, —SH, —$B(OH)_2$, cyclic boronic ester, —$NZ_1Z_2$, —$SO_2NZ_1Z_2$, —$SO_2X$, —$CONZ_1Z_2$, —COX, F, Cl, Br or I ($Z_1$ and $Z_2$ are each H, M, or $SiMe_3$, M is alkali metal (Li, Na, K, Rb, Cs, and Fr) or alkali earth metal (Be, Mg, Ca, Sr, Ba, and Ra), and X is halogen or OH), and $Ar_1$, and Y may be each arbitrarily selected in the repeating unit.

27. The process for producing an electrolyte according to claim 23, wherein the reaction step is a step of bonding the monomer A or the polymer A and the monomer B or the polymer B by using a condensation reaction, a nucleophilic substitution reaction, or a coupling reaction.

* * * * *

UNITED STATES PATENT AND TRADEMARK OFFICE
CERTIFICATE OF CORRECTION

PATENT NO. : 8,440,365 B2  
APPLICATION NO. : 12/318411  
DATED : May 14, 2013  
INVENTOR(S) : Naohiro Hoshikawa et al.

It is certified that error appears in the above-identified patent and that said Letters Patent is hereby corrected as shown below:

In the Claims:

Column 43, line 23, Claim 8, "ally" should be --allyl--.

Column 44, line 51, Claim 25, the formula "$T_3\text{-}[Rf\text{-}E_1]_m\text{-}Rf'\text{-}T_4$" should be --$T_3\text{-}[Rf\text{-}E_1]_{m'}\text{-}Rf''\text{-}T_4$--.

Column 44, line 61, Claim 25, "Rf'" should be --Rf''--.

Signed and Sealed this  
Twentieth Day of August, 2013

Teresa Stanek Rea  
*Acting Director of the United States Patent and Trademark Office*